United States Patent [19]
Ohta

[11] Patent Number: 5,917,554
[45] Date of Patent: Jun. 29, 1999

[54] PICTURE SIGNAL PROCESSING APPARATUS

[75] Inventor: Masashi Ohta, Tokyo, Japan

[73] Assignee: Sony Corporation, Tokyo, Japan

[21] Appl. No.: 08/583,552

[22] Filed: Jan. 5, 1996

[30] Foreign Application Priority Data

Jan. 20, 1995 [JP] Japan .................................. 7-007074

[51] Int. Cl.⁶ .................................................. H04N 9/74
[52] U.S. Cl. ........................ 348/581; 348/452; 348/625; 348/628; 348/451
[58] Field of Search ..................... 348/448, 451, 348/452, 431, 561, 562, 701, 441, 581, 628, 625, 616, 619, 620; H04N 9/74

[56] References Cited

U.S. PATENT DOCUMENTS

| | | | |
|---|---|---|---|
| 4,884,136 | 11/1989 | Ninomiya et al. | 348/701 |
| 4,967,271 | 10/1990 | Campbell et al. | 348/701 |
| 4,998,168 | 3/1991 | Gillard | 348/451 |
| 5,021,870 | 6/1991 | Motoe et al. | 348/451 |
| 5,051,826 | 9/1991 | Ishii et al. | 348/448 |
| 5,081,532 | 1/1992 | Rabii | 348/452 |
| 5,095,354 | 3/1992 | Sokawa et al. | 348/452 |
| 5,227,866 | 7/1993 | Sarugaku et al. | 348/441 |
| 5,253,064 | 10/1993 | Yamamoto et al. | 348/581 |
| 5,321,507 | 6/1994 | Ko et al. | 348/701 |
| 5,386,235 | 1/1995 | Ko | 348/431 |
| 5,430,497 | 7/1995 | Strolle et al. | 348/607 |
| 5,444,493 | 8/1995 | Boie | 348/448 |
| 5,467,138 | 11/1995 | Gove | 348/452 |
| 5,596,371 | 1/1997 | Pakhchyan et al. | 348/452 |
| 5,602,591 | 2/1997 | Saiki | 348/699 |
| 5,631,706 | 5/1997 | Tsunashima | 348/452 |
| 5,671,018 | 9/1997 | Ohara et al. | 348/452 |

*Primary Examiner*—John K. Peng
*Assistant Examiner*—Linus H. Lo
*Attorney, Agent, or Firm*—Frommer Lawrence & Haug, LLP.; William S. Frommer

[57] ABSTRACT

A picture signal processing device for processing picture signals for displaying e.g., an enlarged picture, a contracted picture or a still picture. The picture signal processing device includes a motion detection unit for comparing the picture signal level of a pixel under detection in a first field or a second field together making up a frame, the picture signal levels of pixels lying close to the pixel under detection and the value of a variably set motion detection coefficient to one another for detecting the possible presence of motion in the picture of the pixel under detection. The first field is formed by every two scanning lines and the second field is formed by the remaining scanning lines. The picture signal processing device also includes a field interpolation unit for effecting intra-field interpolation of the picture signals of the pixel under detection on detection of the motion in the picture of the pixel under detection by the motion detection unit, and a detection coefficient setting unit for variably setting the motion detection coefficient.

7 Claims, 16 Drawing Sheets

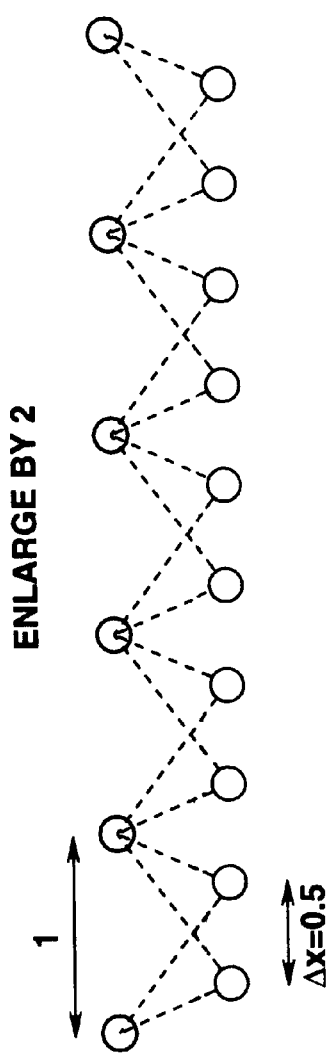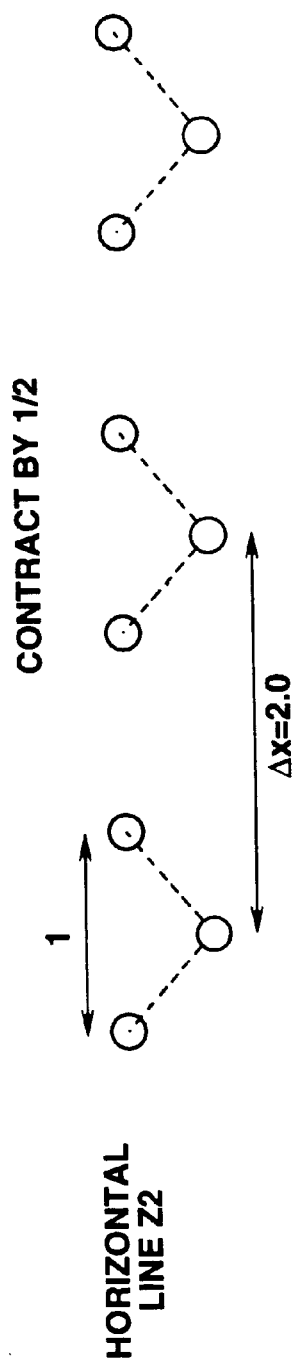

PICTURE SIGNAL PROCESSING APPARATUS

BACKGROUND OF THE INVENTION

This invention relates to a picture signal processing device for processing picture signals for displaying e.g., enlarged, contracted or still pictures.

Nowadays, in a camera-integrated video tape recorder, referred to hereinafter as a camcorder, or a video tape recorder, a picture signal processing device having the function of an electronic zooming of forming picture signals of pixels shown in black circles from picture signals of pixels of white circles by enlarging processing of a horizontal line Z1, with an enlargement ratio of 2, as shown in FIG. 1A, the function of forming picture signals of pixels shown in black circles from picture signals of pixels of white circles by reducing processing of the horizontal line Z1, with a contraction ratio of 2, as shown in FIG. 2B, or the function of an electronic still of displaying a still picture by still picture processing, has become widespread.

In distinction from moving pictures, the enlarged picture and the still picture may be visually recognized easily on the pixel basis.

Thus, in connection with the above-described picture signal processing device, there is known a method of improving the picture quality by intra-field interpolation on detection of motion in a pixel-based picture, according to which, if, among pixels A, B, C and D of horizontal lines 1, 3, 5 and 7 of a first field and pixels E, F G and H of the horizontal lines 2, 4, 6 and 8 of a second field making up a frame with the first field, as shown in FIG. 2, the pixel G has been detected to be a moving pixel, picture signals of the pixel G of the second field are formed by intra-field interpolation from the pixels C and D respectively positioned above and below the pixel G and the picture signals of the pixels of the second field other than the pixel G, that is the pixels E and F, are formed by inter-field interpolation from the pixels A and B and from the pixels B and C of the first field disposed above and below the pixels E and F.

Meanwhile, motion detection in a picture is usually achieved based upon the picture signal level of detection scanning lines of the first field or the second field and the picture signal level of a scanning line neighboring to the detection scanning lines. If an edge component is present in the horizontal direction of picture signals, intra-field interpolation is performed based on mistaken motion detection in a picture even in case no motion has occurred in the picture, with the result that the picture quality by intra-field interpolation is deteriorated as compared to that by inter-field interpolation.

In addition, the picture processing device is in need of a memory for storing picture signals of 4-field picture signals, namely the picture signals of the first and second fields for detecting the motion of pictures, picture signals produced by the intra-field interpolation and picture signals of an enlarged picture, thus raising the cost.

On the other hand, if the motion of the picture of detected pixels is detected, since frame picture signals are generated based upon the first and second interpolated picture signals generated by intra-field interpolation in the first and second fields, as shown in FIGS. 3A and 3B, density fluctuations or picture signal level reversion is likely to occur on a boundary line of the interpolated portions of a picture represented by a frame.

OBJECT AND SUMMARY OF THE INVENTION

It is therefore an object of the present invention to provide a picture signal processing device for achieving a high-quality picture by a simplified construction.

In one aspect, the present invention provides a picture signal processing device having motion detection means for comparing the picture signal level of a pixel under detection in a first field or a second field together making up a frame, with the first field being formed by every two scanning lines and the second field being formed by the remaining scanning lines, the picture signal levels of pixels lying close to said pixel under detection and the value of a variably set motion detection coefficient to one another for detecting the possible presence of motion in the picture of the pixel under detection. The picture signal processing device also has field interpolation means for effecting intra-field interpolation of the picture signals of the pixel under detection on detection of motion in the picture of the pixel under detection by the motion detection means, and detection coefficient setting means for variably setting the motion detection coefficient.

In another aspect, the present invention provides a picture signal processing device having motion detection means for comparing the picture signal level of a pixel under detection in a first field or a second field together making up a frame, with the first field being formed by every two scanning lines and the second field being formed by the remaining scanning lines, the picture signal levels of pixels lying close to the pixel under detection and the value of a motion detection coefficient to one another for detecting the possible presence of motion in the picture of the pixel under detection. The picture signal processing device also has horizontal lone point removing means for interpolating a lone point as a pixel under detection whose motion has not been detected, and for removing the lone point which is a pixel under detection whose motion has been independently detected in the horizontal direction of the frame by the motion detection means, and field interpolating means for effecting intra-field interpolation of the picture signals, other than those of the lone point, whose motion has been detected by the motion detection means.

In still another aspect, the present invention provides a picture signal processing device having motion detection means for comparing the picture signal level of a pixel under detection in a first field or a second field together making up a frame, with the first field being formed by every two scanning lines and the second field being formed by the remaining scanning lines, the picture signal levels of pixels lying close to the pixel under detection and the value of a motion detection coefficient to one another for detecting the possible presence of motion in the picture of the pixel under detection. The picture signal processing device also has interpolation area enlarging means for enlarging the interpolation area interpolating the picture signals of the pixels under detection on detection of motion of the picture of the pixel under detection by the motion detection means, and field interpolation means for intra-field interpolation of picture signals with the area of interpolation enlarged by the interpolation area enlarging means.

In yet another aspect, the present invention provides a picture signal processing device having motion detection means for comparing the picture signal level of a pixel under detection in a first field or a second field together making up a frame, with the first field being formed by every two scanning lines and the second field being formed by the remaining scanning lines, the picture signal levels of pixels lying close to the pixel under detection and the value of a motion detection coefficient to one another for detecting the possible presence of motion in the picture of the pixel under detection. The picture signal processing device also has interpolation area enlarging means for enlarging the interpolation area interpolating the picture signals of the pixels under detection on detection of motion of the picture of the pixel under detection by the motion detection means, smoothing means for smoothing the picture signals of the interpolation area enlarged by the interpolation area enlarging means, and field interpolation means for intra-field interpolation of picture signals with the smoothed and enlarged area of interpolation.

Preferably, the motion detection means detects the presence or absence of motion of the pixel under detection in the horizontal direction, both oblique directions and in the vertical direction based on comparison between the picture signal level of a pixel under detection in a first field or a second field together making up a frame, with the first field being formed by every two scanning lines and said second field being formed by the remaining scanning lines, the picture signal levels of pixels lying close to said pixel under detection and the value of a motion detection coefficient.

Preferably, the motion detection means detects the presence or absence of motion of the picture of the pixel under detection in the vertical direction based upon the picture signals of a frame freed of horizontal components.

Preferably, vertical edge detection means is provided for detecting the vertical edge based upon the picture signal level difference between neighboring scanning lines in a frame. The detection coefficient setting means sets the motion detection coefficient for lowering the motion detection sensitivity of the motion detection means on vertical edge detection by the vertical edge detection means.

Preferably, detection coefficient setting means sets the motion detection coefficient for lowering the detection sensitivity of motion of the motion detection means if the motion detection means detects the presence of motion based upon picture signals of a directly previous horizontal line.

Preferably, the motion detection coefficient of the motion detection means can be set variably, and the picture signal processing device further includes vertical edge detection means for detecting a vertical edge based upon the picture signal level difference between neighboring scanning lines of respective scanning lines within a frame, and detection coefficient setting means for setting motion detection coefficients for lowering the motion detection sensitivity of the motion detection means on vertical edge detection by the vertical edge detection means.

Preferably, the motion detection coefficient of the motion detection means can be set variably, and the picture signal processing device further includes detection coefficient setting means for setting the motion detection coefficient for lowering the motion detection sensitivity of the motion detection means on detection of the presence of motion by the motion detection means based upon picture signals of a directly previous horizontal line.

With the above-described constitution of the picture signal processing device according to the present invention, the motion detection coefficient of the motion detection means is variably set in the motion detection coefficient setting means for varying the threshold value based on which the presence or absence of motion detection is judged in order to give a decision as to whether or not the intra-field interpolation is to be performed by field interpolation means based upon the results of detection by the motion detection means.

It is also decided whether or not intra-field interpolation is to be performed by the field interpolation means based upon the results of motion detection by motion detection means of the picture signals freed of lone points by the horizontal lone point removing means.

If the motion of the picture of the pixel under detection is detected by motion detection means, the area of interpolation in which to interpolate the picture signals of the pixel under detection is enlarged by interpolation area enlargement means.

Also, if the motion of the picture of the pixel under detection is detected by motion detection means, the area of interpolation in which to interpolate the picture signals of the pixel under detection is enlarged by interpolation area enlargement means, and the area of interpolation thus enlarged is smoothed by smoothing means.

The motion detection means detects the possible presence of motion in the horizontal direction, both oblique directions and in the vertical direction.

If the vertical edge is detected by the vertical edge detection means, the detection sensitivity of the motion detection means is lowered.

The motion detection coefficient is set so that the motion detection sensitivity of the motion detection means will be lowered on detection of the presence of motion based upon picture signals of the directly previous horizontal line.

BRIEF DESCRIPTION OF THE DRAWINGS

FIGS. 1A and 1B schematically show the process of formation of enlarged and contracted pictures by field interpolation means and the conventional picture signal processing device, FIG. 1A showing pixels in case of enlargement by 2 and FIG. 1B showing pixels in case of contraction by ½.

DESCRIPTION OF THE PREFERRED EMBODIMENTS

Figure 2:
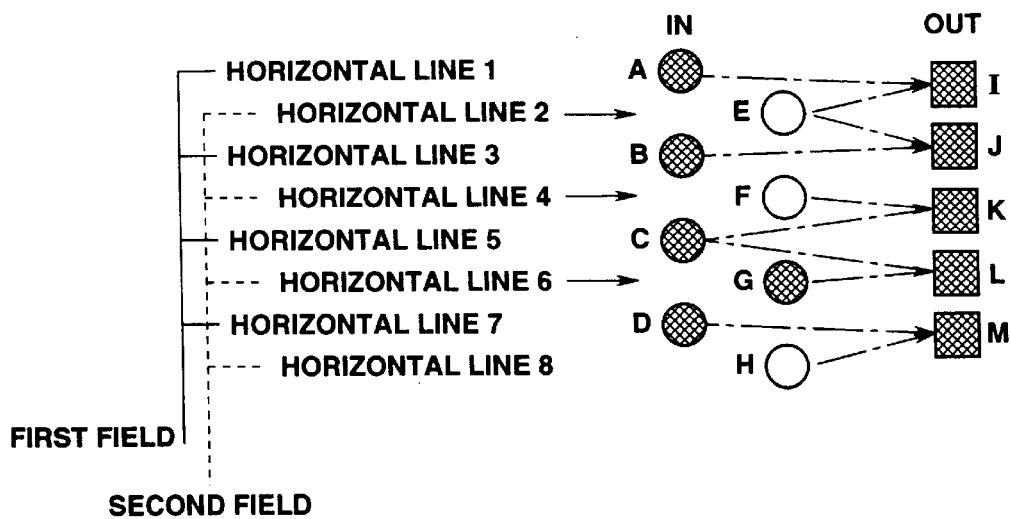
FIG. 2 schematically shows frame/field signal processing by a conventional picture signal processing device.
Figure 3A:
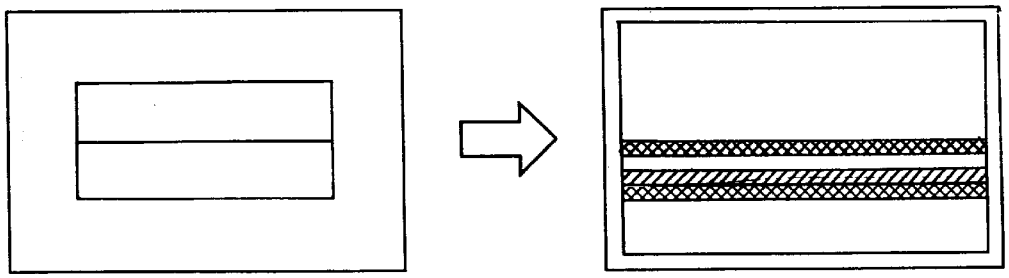
FIGS. 3A and 3B show a picture produced on frame/field signal processing by the conventional picture signal processing device, FIG. 3A showing a picture being outputted and FIG. 3B showing an essential portion of a picture being outputted.
Figure 3B:
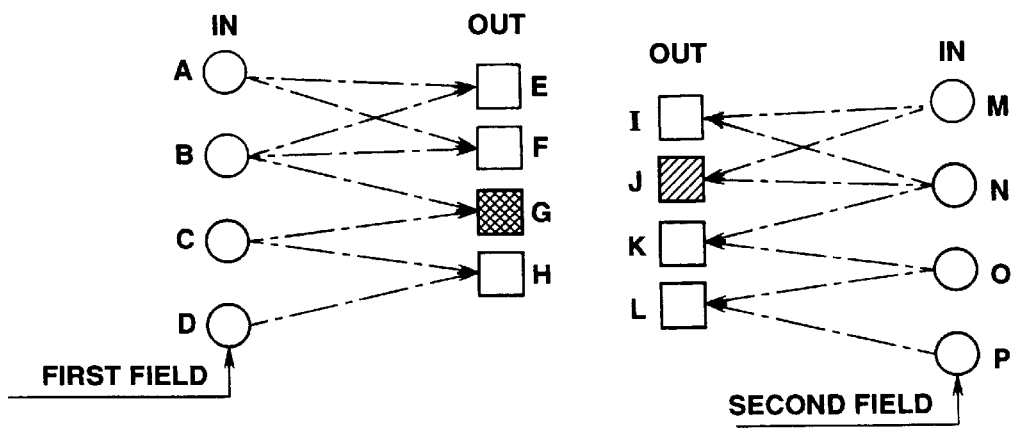

Referring to the drawings, preferred embodiments of picture signal processing device according to the present invention will be explained in detail.

Figure 4:
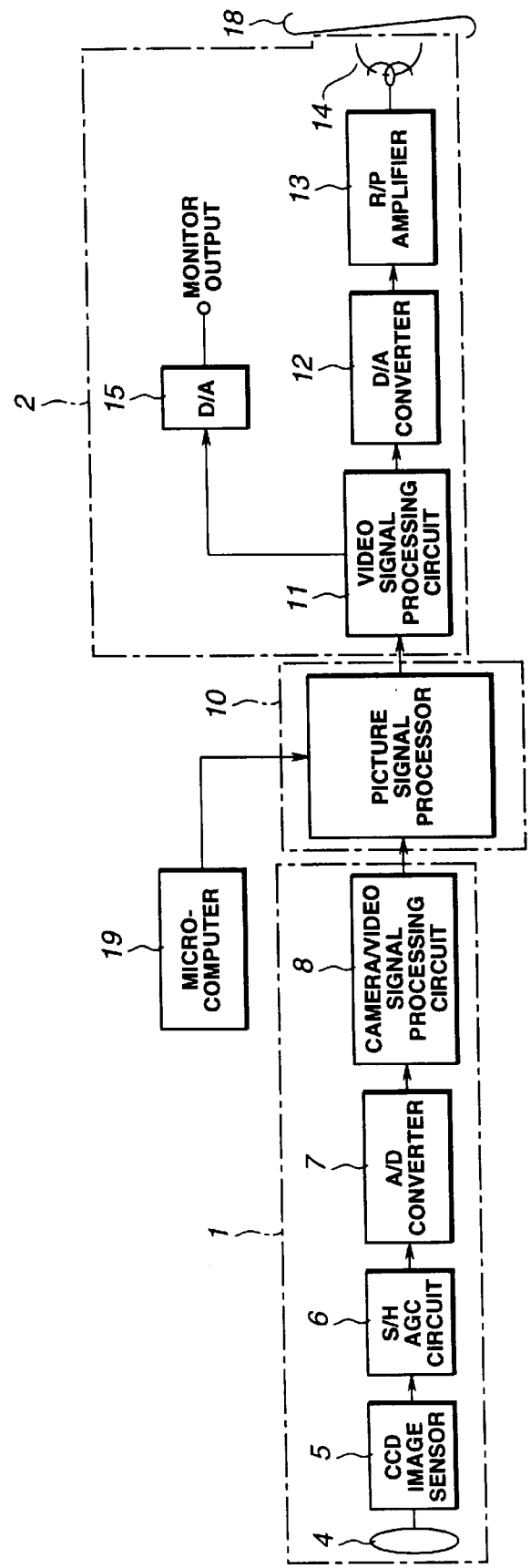
FIG. 4 is a block diagram of a camcorder having a picture signal processing device according to the present invention.

A picture signal processing device 10 according to the present invention is provided in e.g., a camcorder, and is configured for processing picture signals supplied from an imaging unit 1 in accordance with instructions from a micro-computer 19 for outputting a still picture or an enlarged picture to a picture outputting unit 2, as shown for example in FIG. 4.

The imaging unit 1 includes a lens 4 irradiated with an imaging light beam and a CCD image sensor 5 for generating imaging signals by photo-electric conversion of the imaging light beam from the lens 4. The imaging unit 1 also includes a S/H-AGC circuit 6 for adjusting the imaging signal level from the CCD image sensor 5 to a constant level, and an A/D converter 7 for A/D conversion of the imaging signals supplied from the S/S-AGC circuit 6. The imaging unit 1 also includes a camera/video signal processing circuit 8 for processing the imaging signals from the A/D converter 7 by gamma correction or white balance adjustment for generating picture signals and outputting the picture signals to the picture signal processing device 10.

The imaging unit 1 generates picture signals from the imaging signal and routes the picture signals to the picture signal processing device 10.

The picture outputting unit 2 includes a video signal processing circuit 11 for processing the picture signals supplied from the picture signal processing device 10 by emphasis, FM modulation or conversion to low-range signals for generating composite picture signals, and a D/A converter 12 for D/A conversion of the composite picture signals supplied from the video signal processing circuit 11. The picture outputting unit 2 also includes a R/P amplifier 13 for amplifying composite picture signals supplied from the D/A converter 12 and a video head 14 for electromagnetically converting the composite video signals from the R/P amplifier 13 for recording on a magnetic tape 18. The picture outputting unit 2 further includes a D/A converter 15 for D/A converting the composite video signals supplied from the video signal processing circuit 11 for displaying the picture on a monitor.

The picture outputting unit 2 outputs the picture signals supplied from the picture processing device 10 after previous picture signal processing.

The micro-computer 19 sends command signals to the picture signal processing device 10 when outputting the enlarged picture, contracted picture or the still picture.

Figure 5:
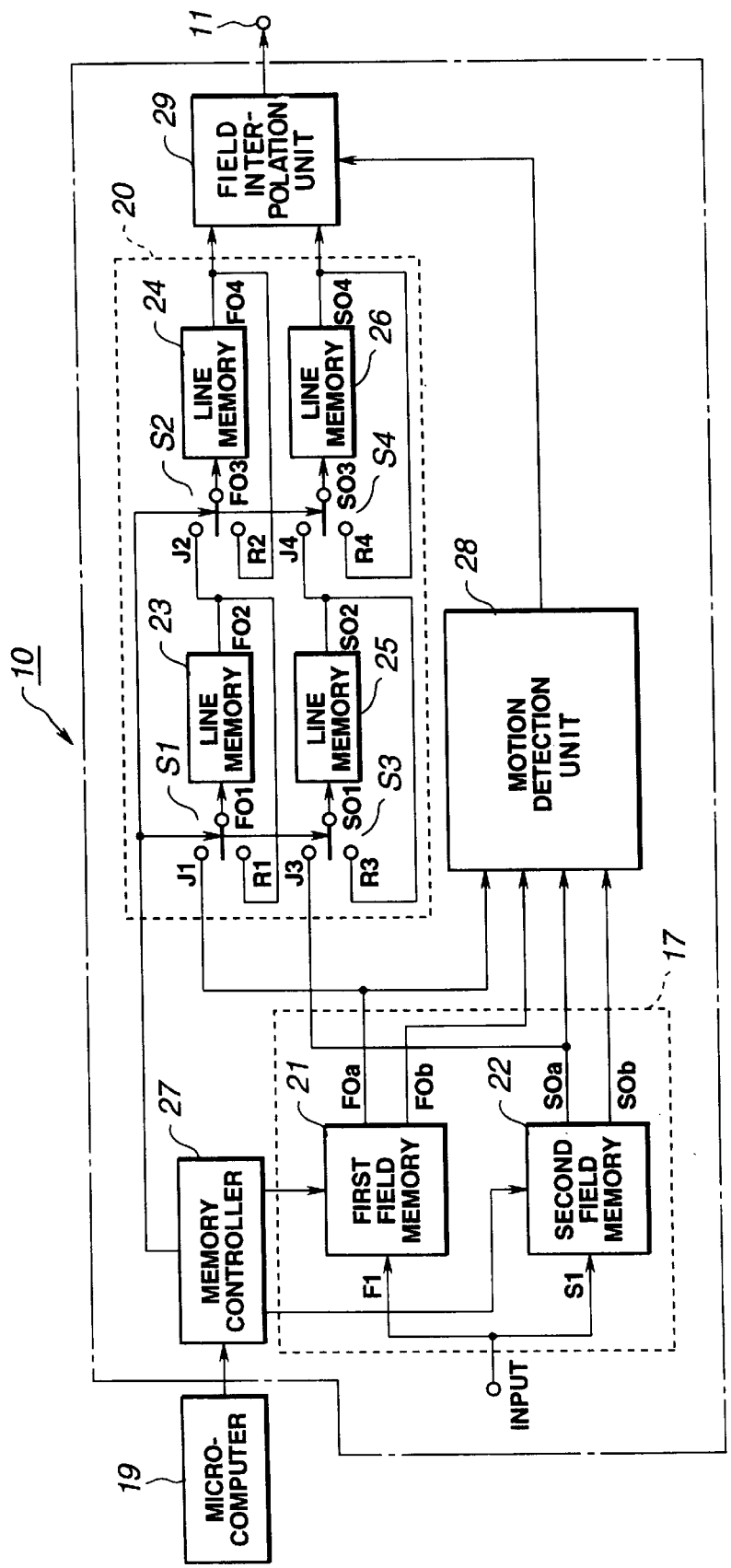
FIG. 5 is a block diagram of the picture signal processing device according to the present invention.

Referring to FIG. 5, the picture signal processing device 10 according to the present invention includes a frame storage unit 17 for readably storing picture signals supplied from the imaging unit 1, and an enlargement processing unit 20 for enlarging picture signals read out from the frame storage unit 17. The picture signal processing device also includes a memory controller 27 for controlling the frame storage unit 17 and the enlargement processing unit 20, and a motion detection unit 28 for detecting picture motion of the pixels under detection of picture signals read out from the frame storage unit 17. The picture signal processing device also includes a field interpolation unit 29 for intra-field interpolation of pixels whose motion has been detected by the motion detection unit 28.

The frame storage unit 17 has first and second field memories 21, 22 in which are readably recorded picture signals of the first and second fields of picture signals supplied from the imaging unit 1.

Figure 6:
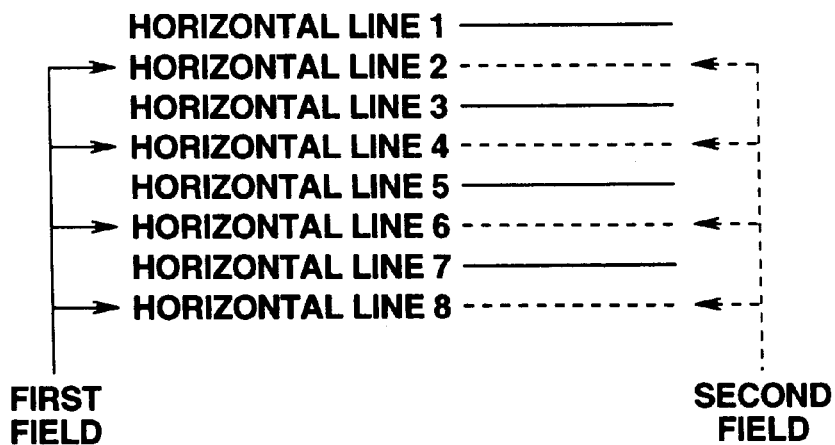
FIG. 6 schematically shows picture signals supplied to the picture signal processing device on the horizontal line basis.

Referring to FIGS. 5 and 6, the first field memory 21 includes an input terminal FI supplied with odd-numbered horizontal lines 1, 3, 5, 7, . . . of the first field of picture signals, an output terminal FO$a$ for outputting the recorded picture signals to the line memory 23 and to the motion detection unit 28 and an output terminal FO$b$ for outputting the recorded picture signals to the motion detection unit 28. Picture signals of the first field supplied to the input terminal FI are recorded in the first field memory 21, while the recorded picture signals of the first field are read out at respective independent readout timings at the output terminals FO$a$, FO$b$ on the horizontal line basis.

Referring again to FIGS. 5 and 6, the second field memory 22 includes an input terminal SI supplied with even-numbered horizontal lines 2, 4, 6, 8, . . . of the first field of picture signals, an output terminal SO$a$ for outputting the recorded picture signals to the line memory 25 and to the motion detection unit 28 and an output terminal SO$b$ for outputting the recorded picture signals to the motion detection unit 28. Picture signals of the second field supplied to the input terminal SI are recorded in the second field memory 22, while the recorded picture signals of the second field are read out at respective independent readout timings at the output terminals SO$a$, SO$b$ on the horizontal line basis.

The enlargement processing means 20 includes a switch S1 supplied with picture signals from the field memory 21, and a line memory 23 for storing the picture signals supplied from the switch S1 on the horizontal line basis. The enlargement processing means 20 also includes a switch S2 supplied with picture signals from the line memory 23, and a line memory 24 for storing the picture signals supplied from the switch S2 on the horizontal line basis. The enlargement processing means 20 also includes a switch S3 supplied with picture signals from the second field memory 22, and a line memory 25 for storing the picture signals supplied from the switch S3 on the horizontal line basis. The enlargement processing means 20 also includes a switch S4 supplied with picture signals from the second field memory 25, and a line memory 26 for storing the picture signals supplied from the switch S4 on the horizontal line basis.

The memory controller 27 controls the write/read to or from the field memories 21, 22 and switching of the switches S1, S2, S3 and S4 under instructions by the micro-computer 19.

The switch S1 includes a first input terminal J1 fed with an output signal at the output terminal FO$a$ of the first field memory 21, a second input terminal R1 fed with an output signal at an output terminal FO2 of the line memory 23, and an output terminal for allowing an output signal at the first input terminal J1 or the second input terminal R1 to be routed to an input terminal FO1 of the line memory 23 under switching control of the memory controller 27.

The switch S2 includes a first input terminal J2 fed with an output signal at an output terminal FO2 of the line memory 23, a second input terminal R2 fed with an output signal at an output terminal FO4 of the line memory 24, and an output terminal for allowing an output signal at the first input terminal J2 or the second input terminal R2 to be routed to an input terminal FO3 of the line memory 24 under switching control of the memory controller 27.

The switch S3 includes a first input terminal J3 fed with an output signal at an output terminal SO*a* of the second field memory 22, a second input terminal R3 fed with an output signal at an output terminal SO2 of the line memory 25, and an output terminal for allowing an output signal at the first input terminal J3 or the second input terminal R3 to be routed to an input terminal SO1 of the line memory 25 under switching control of the memory controller 27.

The switch S4 includes a first input terminal J4 fed with an output signal at an output terminal SO2 of the line memory 25, a second input terminal R4 fed with an output signal at an output terminal SO4 of the line memory 26, and an output terminal for allowing an output signal at the first input terminal J4 or the second input terminal R4 to be routed to an input terminal SO3 of the line memory 26 under switching control of the memory controller 27.

The memory controller 27 manages control of writing the first field represented by odd-numbered lines of the frame in the first field memory 21, while writing the second field represented by even-numbered lines of the frame in the second field memory 22, under instructions by the microcomputer 19. In addition, the memory controller 27 manages switching control of causing output signals of the first input terminals J1, J2, J3 and J4 or the second input terminals R1, R2, R3 and R4 to be issued from output terminals of the switches S1, S2, S3 and S4 for the switch control signals in the high or low states, respectively, as shown in FIG. 7, while managing control to read out picture signals of mutually neighboring odd-numbered lines twice from the output terminals FO*a* and FO*b* of the first field memory 21 and to read out picture signals of mutually neighboring even-numbered lines twice from the output terminals SO*a* and SO*b* of the second field memory 22 during each cycle of the switch control signal.

Figure 7:
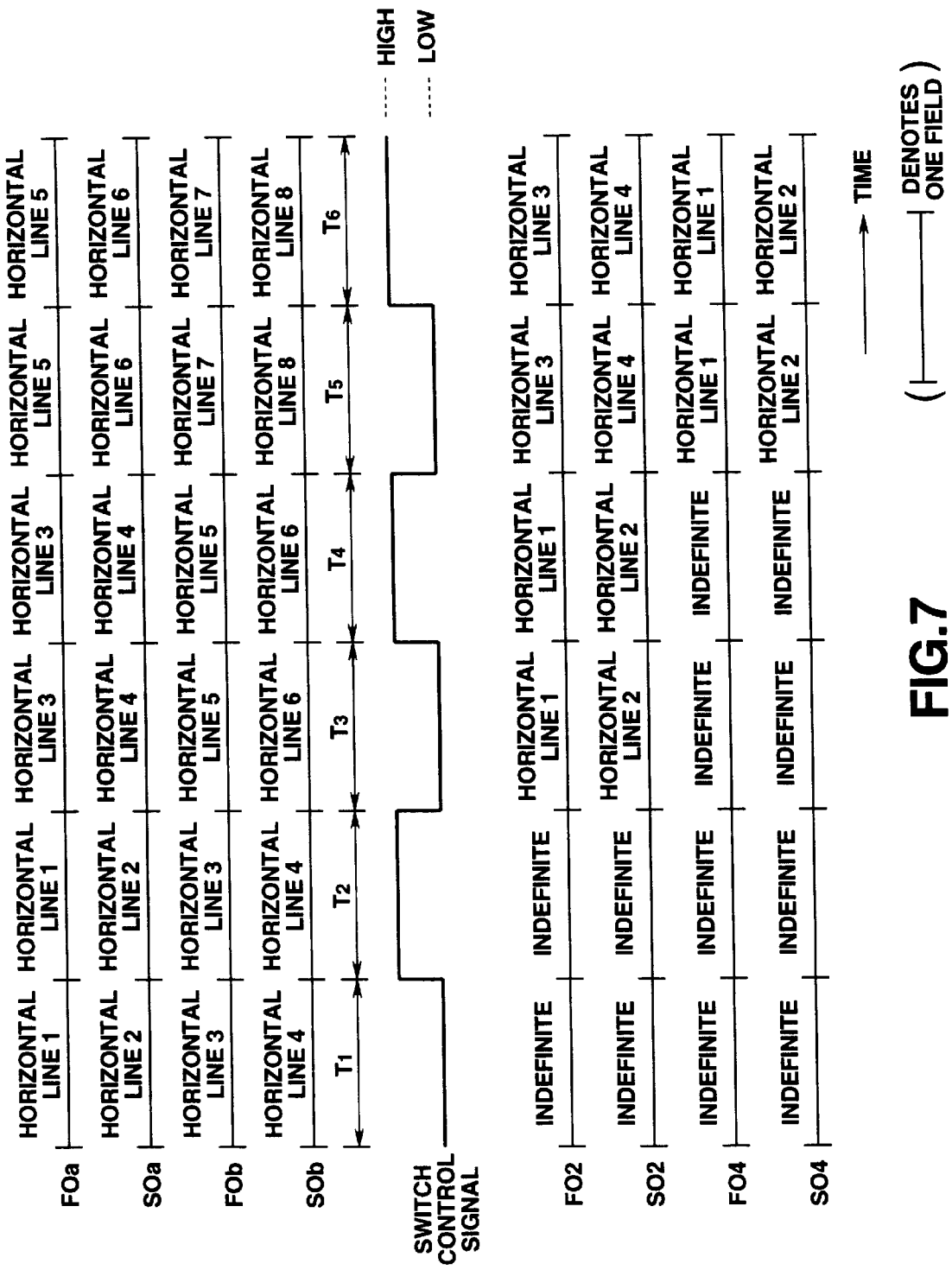
FIG. 7 is a time chart for enlargement processing means of the picture signal processing device.

Referring to FIG. 7, the enlarging operation by the frame storage unit 17, enlargement processing unit 20 and the memory controller 27 in case the horizontal lines 1 to 8 shown in FIG. 6 have been supplied to the frame storage unit 17 of the above-described picture signal processing device 10, is hereinafter explained.

At a time T1, with the switch control signal being in a low state, the output terminals of the switches S1, S2, S3 and S4 are connected to the second input terminals R1, R2, R3 and R4 and picture signals of the horizontal lines 1 and 2 are read from the output terminals FO*a* and SO*a* of the first and second field memories 21, 22 so as to be routed to the switches S1 and S3 and the motion detection unit 28, while picture signals of the horizontal lines 3 and 4 are read from the output terminals FO*b* and SO*b* of the first and second field memories 21, 22 so as to be routed to the motion detection unit 28.

At a time T2, with the switch control signal being in a high state, the output terminals of the switches S1, S2, S3 and S4 are connected to first input terminals J1, J2, J3 and J4 and picture signals of the horizontal lines 1 and 2 are read from the output terminals FO*a* and SO*a* of the first and second field memories 21, 22 so as to be routed to the switches S1 and S3 and to the motion detection unit 28, while picture signals of the horizontal lines 3 and 4 are read from the output terminals FO*b* and SO*b* of the first and second field memories 21, 22 so as to be routed to the motion detection unit 28.

At a time T3, with the switch control signal being in the low state, the output terminals of the switches S1, S2, S3 and S4 are connected to the second input terminals R1, R2, R3 and R4, so that picture signals of the horizontal lines 1 and 2 read out from the output terminals FO*a*, SO*a* of the first and second field memories 21, 22 are held in the line memories 23, 25. On the other hand, picture signals of the horizontal lines 3 and 4 are read from the output terminals FO*a* and SO*a* of the first and second field memories 21, 22 so as to be routed to the switches S1 and S3 and to the motion detection unit 28, while picture signals of the horizontal lines 5 and 6 are read from the output terminals FO*b* and SO*b* of the first and second field memories 21, 22 so as to be routed to the motion detection unit 28.

At time T4, with the switch control signal being high, the output terminals of the switches S1, S2, S3 and S4 are connected to the first input terminals J1, J2, J3 and J4 for sending out the horizontal lines 1 and 2 held by the line memories 23, 24 to the line memories 24, 26. On the other hand, picture signals of the horizontal lines 3 and 4 are read from the output terminals FO*a* and SO*a* of the first and second field memories 21, 22 so as to be routed to the switches S1 and S3 and to the motion detection unit 28, while picture signals of the horizontal lines 5 and 6 are read from the output terminals FO*b* and SO*b* of the first and second field memories 21, 22 so as to be routed to the motion detection unit 28.

At a time T5, with the switch control signal being in the low state, the output terminals of the switches S1, S2, S3 and S4 are connected to the second input terminals R1, R2, R3 and R4, while picture signals sent from the line memories 23, 24 are held on the line memories 24, 26 and picture signals of the horizontal lines 3 and 4 sent from the output terminals FO*a*, FO*b* of the first and second field memories 21, 22 are held on the line memories 23, 25. On the other hand, picture signals of the horizontal lines 5 and 6 are read from the output terminals FO*a* and SO*a* of the first and second field memories 21, 22 so as to be routed to the motion detection unit 28.

At time T6, with the switch control signal being high, the output terminals of the switches S1, S2, S3 and S4 are connected to the first input terminals J1, J2, J3 and J4 for sending out the horizontal lines 1 and 2 held by the line memories 23, 24 to the field interpolating unit 29. On the other hand, picture signals of the horizontal lines 3 and 4 held in the line memories 23, 25 are read from the output terminals FO*a* and SO*a* of the first and second field memories 21, 22 so as to be routed to the switches S1 and S3 and to the motion detection unit 28, while picture signals of the horizontal lines 7 and 8 are read from the output terminals FO*b* and SO*b* of the first and second field memories 21, 22 so as to be routed to the motion detection unit 28.

By controlling the frame storage unit 17 and the enlargement processing unit 20 by the memory controller 27 as described above, the horizontal lines 1 to 4 held at time T5 on the line memories 23 to 26 may be read out from the output terminals FO4, SO4, FO2 and SO2 of the line memories 24, 26, 23 and 25 and processed by vertical enlargement processing.

Figure 8:
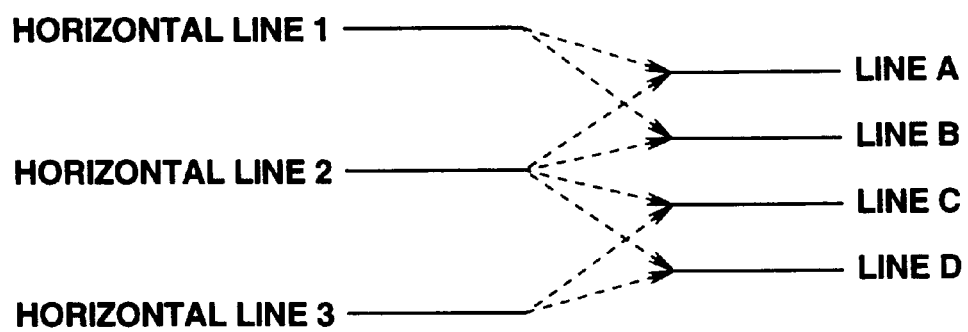
FIG. 8 schematically shows the enlargement processing by the enlargement processing means.

For this enlargement processing, four horizontal lines may be formed from three horizontal lines 1, 2 and 3 for enlargement in the vertical direction by a factor of 4/3 by forming the horizontal lines A and B from the horizontal lines 1 and 2 and by forming the horizontal lies C and D from the horizontal lines 2 and 3, as shown in FIG. 8.

The enlargement ratio may be variably set in dependence upon the number of times of readout operations of picture signals from the field memories 21, 22 during each cycle of the switch control signals.

Figure 9:
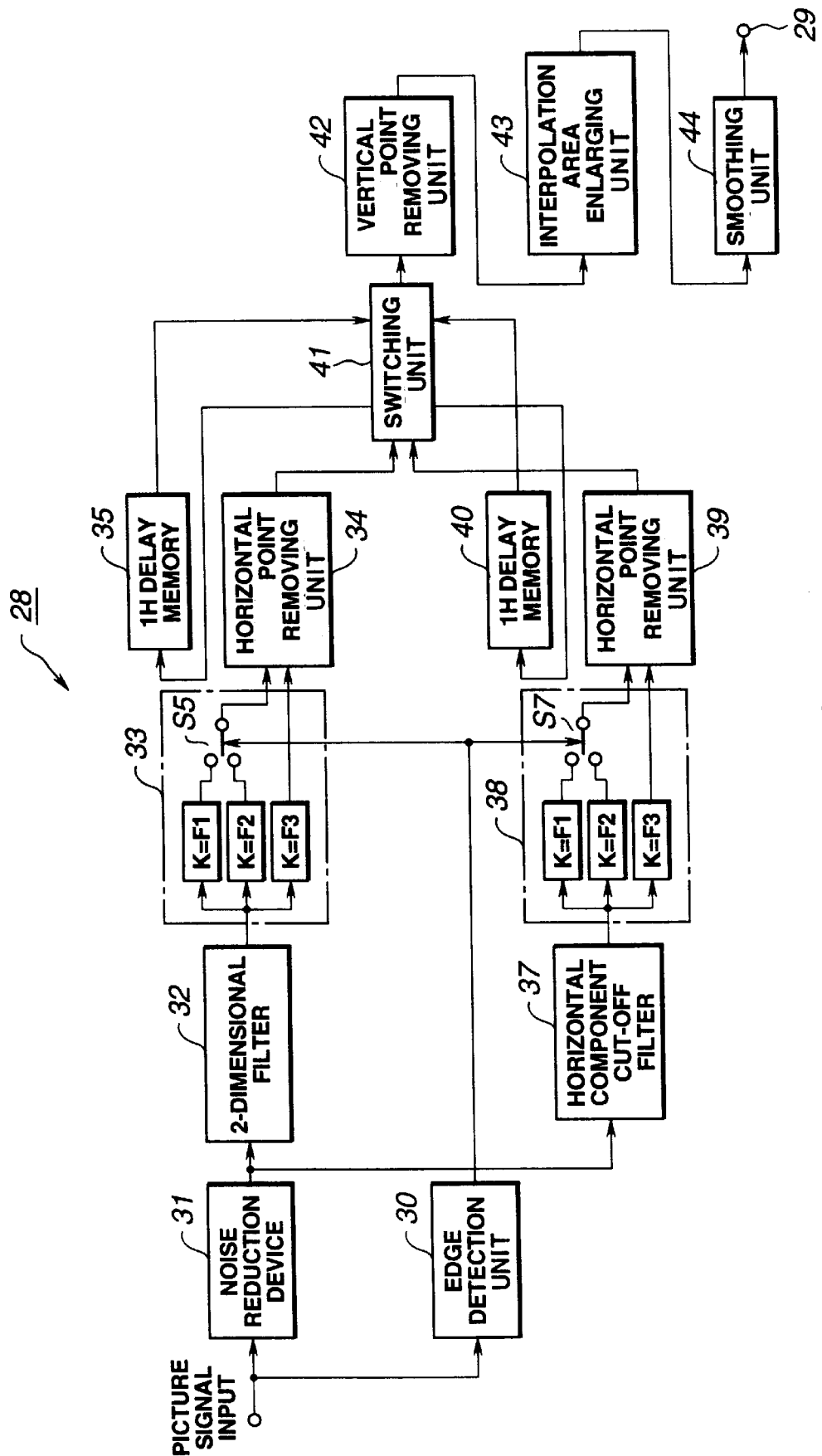
FIG. 9 is a block diagram showing motion detection means and field interpolating means of the picture signal processing device.

Referring to FIG. 9, the motion detection unit 28 includes a vertical edge detection unit 30 for detecting the vertical edge of picture signals supplied from the frame storage unit 17, and a noise reduction circuit 31 for reducing pseudo signals generated from the picture signals at the time of sampling of the CCD image sensor 4 of the imaging unit 1. The motion detection unit 28 also includes a two-dimensional filter 32 for cutting the random noise of picture signals supplied from the noise reduction circuit 31, and a first detection coefficient setting unit 33 for detecting the motion of the picture of a pixel under detection from picture signals supplied from the two-dimensional filter 32. The motion detection unit 28 also includes a horizontal point removing unit 34 for interpolating horizontal points in the horizontal direction of picture signals supplied from the first detection coefficient setting unit 33, and a 1H delay memory 35 in which the results of motion detection of picture signals of a directly previous horizontal line supplied from the horizontal point removing means 34. The motion detection unit 28 also includes a horizontal component cutting filter 37 for cutting the horizontal components of picture signals supplied from the noise reduction circuit 31 and a second detection coefficient setting unit 38 for detecting the motion of the picture of the pixel under detection from the picture signals supplied from the horizontal component cutting filter 37, and a second detection coefficient setting unit 38 for detecting the motion of the picture of the pixel under detection from the picture signals supplied from the horizontal component cutting filter 37. The motion detection unit 28 also includes a horizontal point removing unit 39 for interpolating horizontal points of the picture signals supplied from the second horizontal detection coefficient setting unit 38 and a 1H delay memory 40 in which the results of motion detection picture signals of directly previous horizontal line supplied from the horizontal point removing unit 39 are stored. The motion detection unit 28 also includes a switching unit 41 for switching between output signals of the horizontal point removing units 34, 39 based upon output signals of the 1H delay memories 35, 40, and a vertical point removing unit 42 for interpolating vertical points of picture signals supplied from the switching unit 41. The motion detection unit 28 further includes an interpolation area enlarging unit 43 for enlarging the area of interpolation of picture signals supplied from the vertical point removing unit 42 and a smoothing unit 44 for smoothing the picture signals supplied from the interpolation area enlargement unit 44.

The vertical edge detection unit 30 calculates the difference between the vertical components of mutually neighboring horizontal lines for detecting a vertical edge for switching the motion detection coefficients for lowering the motion detection sensitivity by the first and second detection coefficient setting units on detection of vertical edges.

The motion detection unit 28 is lowered in detection sensitivity by the vertical edge detection unit 30 on vertical edge detection for enabling high precision detection of the motion of the picture of the pixel under detection without mistaken detection of the vertical edge as motion by a simplified configuration for forming a high-quality picture by the picture signal processing device 10.

Figure 10:
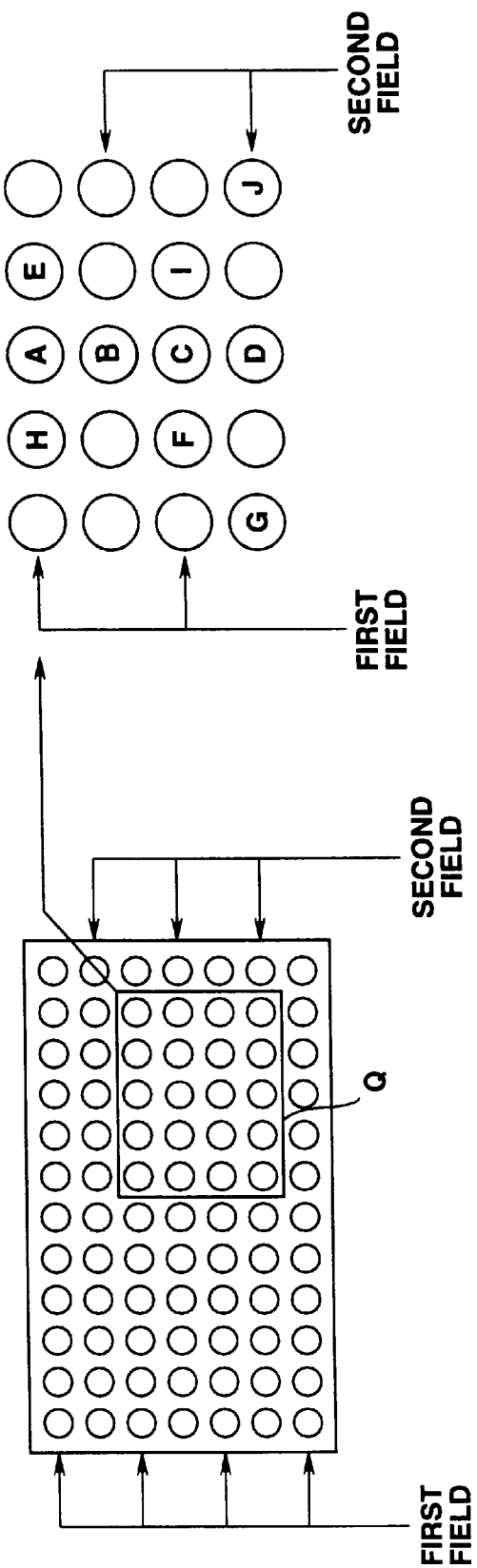
FIG. 10 schematically shows detection of possible presence of picture motion of a pixel by the motion detection means.

Referring to FIG. 10, the first detection coefficient setting unit 33 detects the motion of the pixel under detection B, in an area Q in the vicinity of the pixel under detection B, based upon the picture signal levels of a pixel A directly above the pixel B, a pixel C directly below the pixel B, a pixel D directly below the pixel C, a pixel H on the obliquely upper right side of the pixel B, a pixel I on the obliquely lower right side of the pixel B, a pixel J on the obliquely lower left side of the pixel I, a pixel E on the obliquely upper left side of the pixel B, a pixel F on the obliquely lower left side of the pixe B, and a pixel G on the obliquely lower left side of the pixel F.

Figure 11:
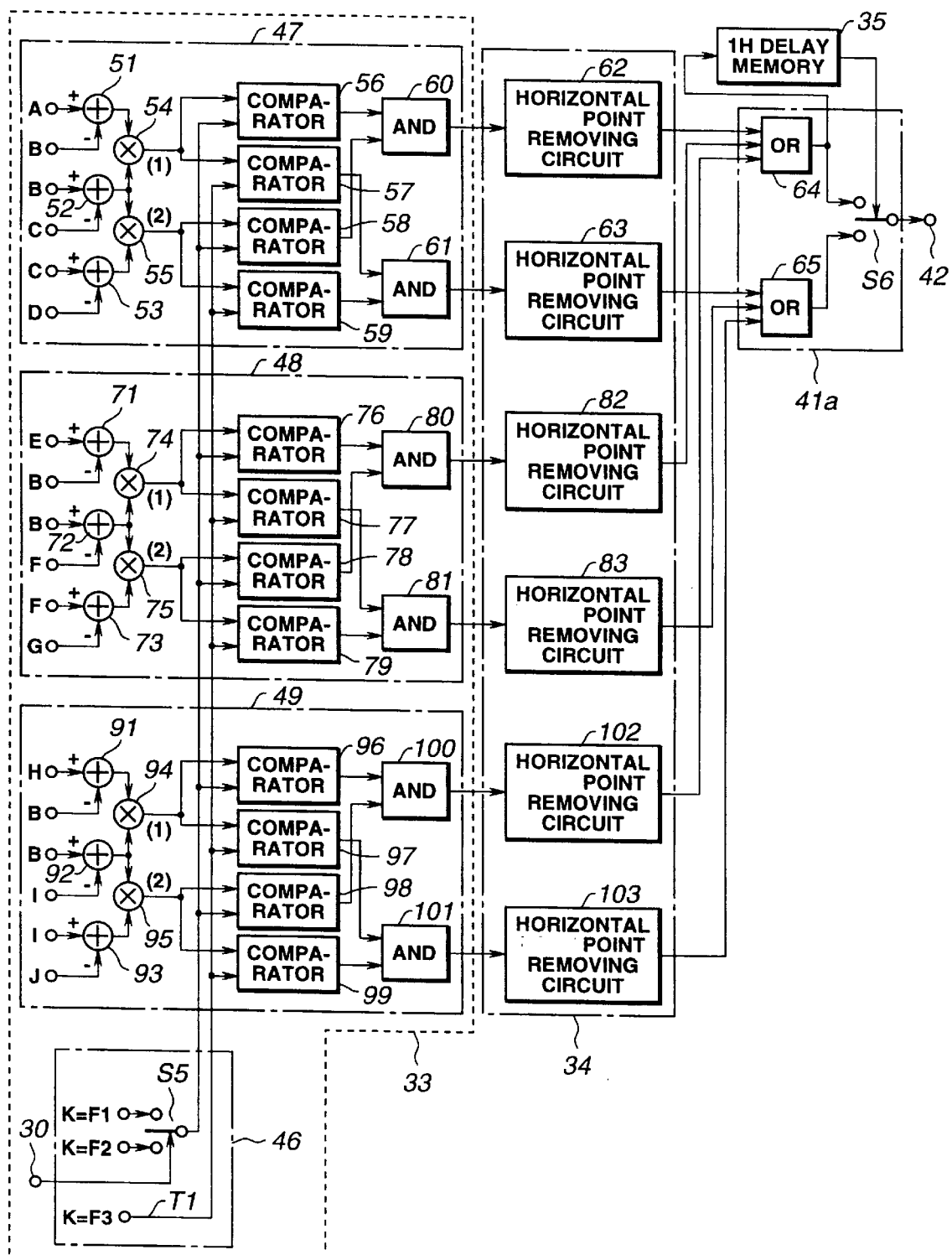
FIG. 11 is a block diagram showing essential portions of the motion detection means.

Referring to FIG. 11, the first detection coefficient setting unit 33 includes a detection coefficient setting unit 46 for setting the motion detection coefficient, a horizontal direction detection unit 47 for detecting movement in the horizontal direction based upon the motion detection coefficient, an oblique right direction sensor 48 for detecting the oblique right movement based upon the motion detection coefficient and an oblique left direction sensor 49 for detecting the oblique left movement based upon the motion detection coefficient.

The detection coefficient setting unit 46 has a switch S5 which has a motion detection coefficient K variably set to F1, F2 or F3, where $|F1|<|F2|<|F3|$, for setting the motion detection information K to F2/F1 based upon detection or non-detection of the vertical edge at the vertical edge detection unit 30 for supplying the motion detection coefficient K to the oblique right direction sensor 48 and to the oblique left direction sensor 49. The detection coefficient setting unit 46 has an output terminal T1 for sending the motion detection coefficient K=F3 to the horizontal direction detection unit 47, oblique right direction sensor 48 and to the oblique left direction sensor 49.

The detection coefficient setting unit 46 routes, based upon the possible detection of the vertical edge by the vertical edge detection unit 30, the motion detection coefficient K=F2/F1 and the motion detection coefficient K=F3 to the horizontal direction detection unit 47, oblique right direction sensor 48 and to the oblique left direction sensor 49.

The horizontal direction detection unit 47 includes a subtractor 51 for subtracting the pixel signal level of the pixel B from the picture signal level of the pixel A and a subtractor 52 for subtracting the picture signal level of the pixel C from the picture signal level of the pixel B. The horizontal direction detection unit 47 also includes a subtractor 52 for subtracting the picture signal level of the pixel D from the picture signal level of the pixel C and a multiplier 54 for multiplying an output signal of the subtractor 51 with an output signal of the subtractor 52. The horizontal direction detection unit 47 also includes a multiplier 55 for multiplying an output signal of the subtractor 52 with an output signal of the subtractor 53 and a comparator 56 for comparing the motion detection coefficient K supplied from the switch S5 of the detection coefficient setting unit 46 to the output signal of the multiplier 54. The horizontal direction detection unit 47 also includes a comparator 57 for comparing the motion detection coefficient F3 supplied from an output terminal T1 of the detection coefficient setting unit 46 and the output signal of the multiplier 54, and a comparator 58 for comparing the motion detection coefficient K supplied from the switch S5 and the output signal supplied from the multiplier 55. The horizontal direction detection unit 47 also includes a comparator 59 for comparing the motion detection coefficient F3 supplied from the output terminal T1 to the output signal of the multiplier 55 and an AND gate 60 for outputting the logical product of the output signal of the comparator 56 and the output signal of the comparator 58 to the horizontal point removing unit 34. The horizontal direction detection unit 47 also includes an AND gate 61 for outputting the logical output of the output signal of the comparator 57 and the output signal of the comparator 59 to the horizontal point removing unit 34.

The signal levels of the pixels under detection B and the neighboring pixels A, C and D are denoted as b, a, c and d, respectively.

The output signal of the comparator 56, fed with the motion detection coefficient K =F2/F1 variably set in the detection coefficient setting unit 46 based upon the possible detection of the vertical edge as described previously, is in the high state and in the low state under the condition of the equation (1):

$$(a-b) \times (b-c) < K \qquad (1)$$

and otherwise, respectively.

That is, the output signal of the comparator 57, fed with the motion detection coefficient K=F3 from the detection coefficient setting unit 46, becomes high and low under the condition of the above equation and otherwise, respectively.

The output signal of the comparator 58, fed with the motion detection coefficient K=F2/F1, variably set by the detection coefficient setting unit 46 based upon the possible vertical edge detection, becomes high and low under the condition of the equation (2):

$$(b-c) \times (c-d) < K \qquad (2)$$

and otherwise, respectively.

That is, the output signal of the comparator 59, fed with the motion detection coefficient K=F3 from the detection coefficient setting unit 46, becomes high and low under the condition of the equation (2) and otherwise, respectively.

With the above-described horizontal direction detection unit 47, at least one of the output signals of the AND gate 60 and the AND gate 61 becomes high or both the output signals of the AND gates 60 and 61 become low based upon the presence or absence of the horizontal motion of the pixel under detection B, respectively.

The oblique right direction detection unit 48 includes a subtractor 71 for subtracting the picture signal level of the pixel B from the picture signal level of the pixel E, and a subtractor 72 for subtracting the picture signal level of the pixel F from the picture signal level of the pixel B. The oblique right direction detection unit 48 also includes a subtractor 73 for subtracting the picture signal level of the pixel G from the picture signal level of the pixel F and a multiplier 74 for multiplying an output signal of the subtractor 71 with the output signal of the subtractor 72. The oblique right direction detection unit 48 also includes a multiplier 75 for multiplying an output signal of the subtractor 72 with the output signal of the subtractor 73 and a comparator 76 for comparing the motion detection coefficient K supplied from the switch S5 of the detection coefficient setting unit 46 to the output signal of the multiplier 74. The oblique right direction detection unit 48 also includes a comparator 77 for comparing the motion detection coefficient F3 supplied from the output terminal T1 of the detection coefficient setting unit 46 to the output signal of the multiplier 74, and a comparator 78 for comparing the motion detection coefficient K supplied from the switch S5 to the output signal of the multiplier 75. The oblique right direction detection unit 48 also includes a comparator 79 for comparing the motion detection coefficient F3 supplied from the output terminal T1 to the output signal of the multiplier 75, an AND gate 80 for outputting the logical product of the output signal of the comparator 76 and the output signal of the comparator 78 to the horizontal point removing unit 34, and an AND gate 81 for outputting the logical product of the output signal of the comparator 77 and the output signal of the comparator 79 to the horizontal point removing unit 34.

The picture signal levels of the pixel under detection B and the neighboring pixels E, F and G are denoted as b, e, f and g, respectively.

The output signal of the comparator 76, fed with the motion detection coefficient K=F2/F1, variably set by the detection coefficient setting unit 46 based upon possible vertical edge detection, becomes high and low under the condition of the equation (3):

$$(e-b) \times (b-f) < K \qquad (3)$$

and otherwise, respectively.

That is, the output signal of the comparator 57, fed with the motion detection coefficient K=F3 from the detection coefficient setting unit 46, becomes high and low under the condition of the equation (3) and otherwise, respectively.

The output signal of the comparator 78, fed with the motion detection coefficient K=F2/F1, variably set by the detection coefficient setting unit 46 based upon possible vertical edge detection, becomes high and low under the condition of the equation (4):

$$(b-f) \times (f-g) < K \qquad (4)$$

and otherwise, respectively.

That is, the output signal of the comparator 79, fed with the motion detection coefficient K=F3 from the detection coefficient setting unit 46, becomes high and low under the condition of the equation (4) and otherwise, respectively.

The AND gate 80 outputs a logical product of outputs of the comparators 76 and 78.

The AND gate 81 outputs a logical product of the comparators 77 and 79.

With the above-described oblique right direction detection unit 48, at least one of the output signals of the AND gate 80 and the AND gate 81 becomes high or both the output signals of the AND gates 80 and 81 become low based upon the presence or absence of the oblique rightward motion of the pixel under detection B, respectively.

The oblique left direction detection unit 49 includes a subtractor 91 for subtracting the picture signal level of the pixel B from the picture signal level of the pixel under detection H, and a subtractor 92 for subtracting the picture signal level of the pixel I from the picture signal level of the pixel B. The oblique left direction detection unit 49 also includes a subtractor 93 for subtracting the picture signal level of the pixel J from the picture signal level of the pixel I and a multiplier 94 for multiplying an output signal of the subtractor 91 with the output signal of the subtractor 92. The oblique left direction detection unit 49 also includes a multiplier 95 for multiplying an output signal of the subtractor 92 with the output signal of the subtractor 93 and a comparator 96 for comparing the motion detection coefficient K supplied from the switch S5 of the detection coefficient setting unit 46 to the output signal of the multiplier 94. The oblique left direction detection unit 49 also includes a comparator 97 for comparing the motion detection coefficient F3 supplied from the output terminal T1 of the detection coefficient setting unit 46 to the output signal of the multiplier 94, and a comparator 98 for comparing the motion detection coefficient K supplied from the switch S5 to the output signal of the multiplier 95. The oblique left direction detection unit 49 also includes a comparator 99 for comparing the motion detection coefficient F3 supplied from the output terminal T1 to the output signal of the multiplier 95, an AND gate 100 for outputting the logical product of the output signal of the comparator 96 and the output signal of the comparator 98 to the horizontal point removing unit 34, and an AND gate 101 for outputting the logical product of the output signal of the comparator 97 and the output signal of the comparator 99 to the horizontal point removing unit 34.

The picture signal levels of the pixel under detection B and the neighboring pixels H, I and J are denoted as b, h, i and i, respectively.

The output signal of the comparator 96, fed with the motion detection coefficient K=F2/F1, variably set by the detection coefficient setting unit 46 based upon possible vertical edge detection, becomes high and low under the condition of the equation (5):

$$(h-b) \times (b-i) < K \tag{5}$$

and otherwise, respectively.

The output signal of the comparator 97, fed with the motion detection coefficient K=F3 from the detection coefficient setting unit 46, becomes high and low under the condition of the equation (5) and otherwise, respectively.

The output signal of the comparator 98, fed with the motion detection coefficient K=F2/F1, variably set by the detection coefficient setting unit 46 based upon possible vertical edge detection, becomes high and low under the condition of the equation (6):

$$(b-i) \times (i-j) < K \tag{6}$$

and otherwise, respectively.

The output signal of the comparator 99, fed with the motion detection coefficient K=F3 from the detection coefficient setting unit 46, becomes high and low under the condition of the equation (6) and otherwise, respectively.

The AND gate 100 outputs a logical product of outputs of the comparators 76 and 78.

The AND gate 101 outputs a logical product of the comparators 77 and 79.

With the above-described oblique left direction detection unit 49, at least one of the output signals of the AND gate 100 and the AND gate 101 becomes high or both the output signals of the AND gates 100 and 101 become low based upon the presence or absence of the oblique leftward motion of the pixel under detection B, respectively.

The above-described first detection coefficient setting unit 33 outputs, based upon the presence or absence of the horizontal movement, movement in the oblique rightward direction or movement in the oblique leftward direction of the pixel under detection B, such output signals corresponding to high state of at least one of the AND gates 60, 61 of the horizontal direction detection unit 47, the AND gates 80, 81 of the oblique right direction detection unit 48 or the AND gates 100, 101 of the oblique left direction detection unit 49, or such output signals corresponding to low states of all of the above AND gates, respectively.

Thus the first detection coefficient setting unit 33 variably sets the threshold value determining the motion detection to an optimum threshold value which prohibits mistaken detection of the vertical edge or noise in the vertical direction as motion, so that the picture of the pixel under detection may be detected highly accurately by a simplified construction, thereby enabling a high-quality picture to be formed in the picture signal processing device 10.

The horizontal point removing unit 34 includes a horizontal point removing circuit 62 for removing the horizontal point from an output signal of the AND gate 60 of the horizontal direction detection unit 47, and a horizontal point removing circuit 63 for removing the horizontal point from an output signal of the AND gate 61 of the horizontal direction detection unit 47. The horizontal point removing unit 34 also includes a horizontal point removing circuit 82 for removing the horizontal point from an output signal of the AND gate 80 of the oblique right direction detection unit 46, and a horizontal point removing circuit 83 for removing the horizontal point from an output signal of the AND gate 81 of the oblique right direction detection unit 46. The horizontal point removing unit 34 also includes a horizontal point removing circuit 102 for removing the horizontal point from an output signal of the AND gate 100 of the oblique left direction detection unit 47, and a horizontal point removing circuit 103 for removing the horizontal point from an output signal of the AND gate 101 of the oblique left direction detection unit 47.

Figure 12:
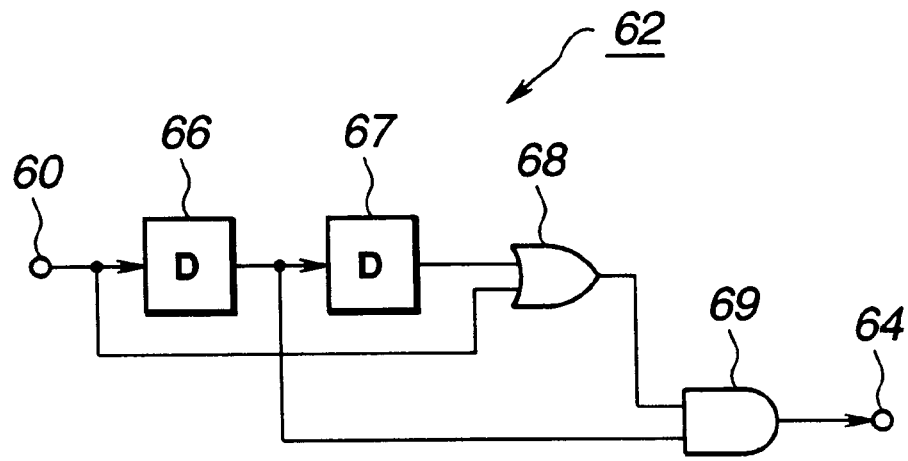
FIG. 12 is a circuit diagram showing horizontal lone point removing means of the motion detection means.

Referring to FIG. 12, the horizontal point removing circuit 62 includes shift registers 66, 67 for shifting picture signals supplied from the AND gate 60 pixel-by-pixel and holding the shifted pixels, an OR gate 68 for outputting a logical sum of the output signal of the AND gate 60 and the output signal of the shift register 67, and an AND gate 69 for outputting the logical product of the output signal of the OR gate 68 and the output signal of the shift register 67.

With the above-described horizontal point removing circuit 62, picture signals of the first, second and third pixels and so forth of e.g., a given horizontal line is sequentially supplied from the AND gate 60, and the second pixel exhibits motion and represents a pixel in the horizontal direction, output signals of the shift registers 67, 66 and the AND gate 60 become picture signals of the first, second and third pixels, respectively. The OR gate 68 ORs picture signals of the first and third pixels neighboring to the second pixel representing the point for interpolating the second pixel for outputting picture signals freed of the point at the AND gate 69.

The horizontal point removing circuits 63, 82, 83, 102 and 103 are configured similarly to the horizontal point removing circuit 62 and interpolate picture signals of horizontally pixels by neighboring pixels on the left and right sides of the points for removing the points.

Thus the point removing unit 34 interpolates the points, that is horizontally pixels, by neighboring pixels on the left and right sides of the points for removing the points.

The point removing unit 34 removes the points not present in the actual motion of an object, and subsequently judges as to motion by the motion detection unit 28 for realizing high precision motion detection of the pixel under detection by a simplified construction, thereby achieving a high-quality picture by the picture signal processing device 10.

The horizontal component cutting filter 37 is constituted by an eight-order low-pass filter for cutting the horizontal components from the supplied picture signals.

The horizontal component cutting filter 37 cuts horizontal components for enabling correct detection of the vertical motion by the vertical motion detection unit 28. Thus the motion of the picture of the pixel under detection may be detected highly correctly, without mistaken detection of the vertical edge as motion, thereby enabling a high-quality picture to be formed by the picture signal processing device 10.

The second detection coefficient setting unit 38 has a circuit construction similar to that of the horizontal direction detection unit 47, oblique right direction detection unit 48 or the oblique left direction detection unit 49, and employs motion detection coefficients K=F4, F5 and F6, associated by one-for-one correspondence with the motion detection coefficients K=, F1, F2 and F3 of the first detection coefficient setting unit 33, where |F4|<|F5|<|F6|.

The second detection coefficient setting unit 38 is fed from the horizontal component cutting filter 37 with picture signals freed of the horizontal components, and outputs a first picture signal, which is a logical product of the equations (1) and (2) in the pixel under detection of the supplied picture signals, where K=F5/F6 is substituted for the motion detection coefficient K, or a second picture signal, which is the result of judgment of the equation (7):

$$|(a+c)/2-b|>K \qquad (7)$$

where K=F6 is substituted for the motion detection coefficient K, depending on the presence or absence of the vertical edge detected by the edge detection unit 30, respectively.

It is possible with the above-described constitution of the second detection coefficient setting unit 38 to positively detect motion in the vertical direction, in dependence upon whether or not the above equations (1) and (2), in which K=F5/K=F4 are substituted for the motion detection coefficient K, or the equation (7), in which K=F6 is substituted for the motion detection coefficient K, holds, based upon the picture signals freed of the horizontal components.

The horizontal point removing unit 39 is configured similarly to the horizontal point removing circuits 62, 63 of the horizontal point removing unit 34 and removes points in the horizontal direction of the first and second picture signals.

The horizontal point removing unit 39 interpolates points, that is picture signals of horizontally pixels, of the first and second picture signals, by neighboring pixels on the left and right sides of the points, for removing the points.

In this manner, a picture may be formed by picture signals removed of the points not present in actual motion of the object, thus enabling a high-quality picture to be achieved with the picture signal processing device 10.

The switching unit 41 includes a first switch 41a, shown in FIG. 8, for switching between the output signals of the horizontal point removing unit 34, a second switch 41b, not shown, for outputting the first picture signals or the second picture signals outputted by the second detection coefficient setting unit 38, and an OR gate, not shown, for outputting a logical sum of the output signal of the first switch 41a and the output signal of the second switch 41b.

Referring to FIG. 11, the first switch 41a has an OR gate 64 for outputting a logical sum of output signals of the horizontal point removing circuits 62, 82 and 102, an OR gate 65 for outputting a logical sum of output signals of the horizontal point removing circuits 63, 83 and 103 and a switch S6 for routing an output signal of the OR gate 64 or the output signal of the OR gate 65 to the vertical point removing unit 42 responsive to an output signal of the 1H delay memory 35 configured for outputting an output signal corresponding to a directly previous horizontal line of the OR gate 65.

In the 1H delay memory 35, the results of line-based motion detection of picture signals are sequentially written, while the results of motion detection of the directly previous horizontal line are read out therefrom, with the motion detection coefficient K being set so that the motion detection sensitivity will be lowered in case such readout indicates the presence of motion.

Since the threshold value for judging the motion by the motion detecting unit 28 may be variably set based upon a horizontal line of picture signals, motion detection of the picture of the pixel under detection can be achieved highly accurately for assuring the high quality of picture signals formed by the picture signal processing device 10 by prompt variable setting of an optimum value which will avoid mistaken detection of the noise or the vertical edge as motion.

The switch S6 is changed over for transmitting an output signal of the OR gate 64 or an output signal of the OR gate 65 when the output signal of the directly previous horizontal line from the line memory 35 is a high level signal or a low level signal, respectively.

The first switch 41a outputs an output signal of the OR gate 64 or an output signal of the OR gate 65 responsive to the presence or absence of detected motion in the picture signals of the directly previous horizontal line which is supplied from the first detection coefficient setting unit 33.

The second switch 41b outputs the first picture signal or the second picture signal responsive to the presence or absence of detected motion in the picture signals of the directly previous horizontal line which is supplied from the second detection coefficient setting unit 38 and which is stored in the 1H delay memory 40.

Thus the switching unit 41 switches between an output signal of the horizontal point removing unit 34 or an output signal of the horizontal point removing unit 39 responsive to the presence or absence of detected motion in the directly previous horizontal line, respectively, for outputting a motion detection signal representing the results of detection derived from the motion detection coefficient K which has been set by the first and second detection coefficient setting units 33, 38 for lowering and raising the sensitivity, respectively.

Figure 13:
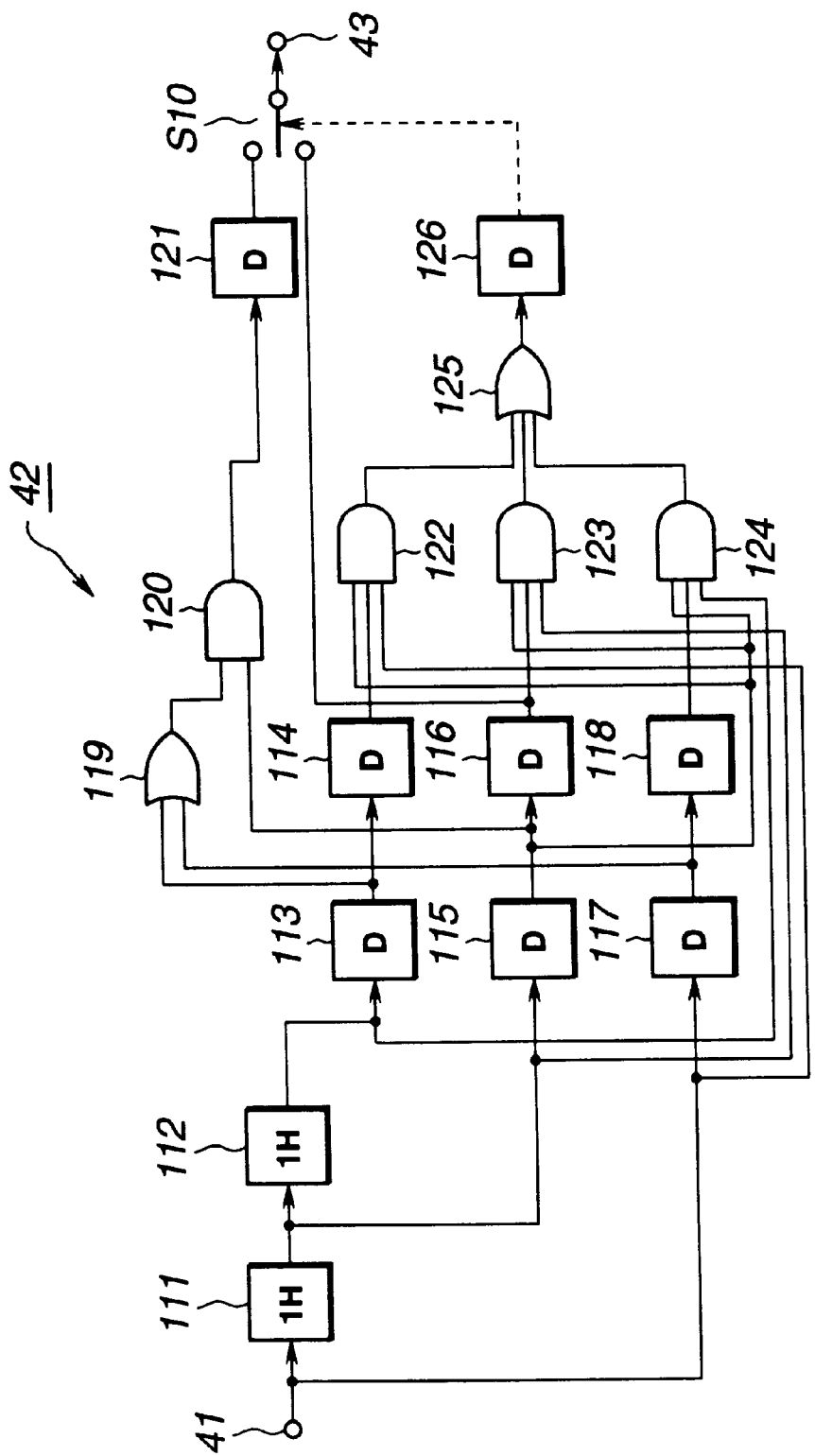
FIG. 13 is a circuit diagram showing vertical lone point removing means of the field interpolation means.

Referring to FIG. 13, the vertical point removing unit 42 includes line memories 111, 112 for sequentially shifting motion detection signals supplied from the switching unit 41 on the horizontal line basis, and pixel memories 113, 114 for sequentially shifting the motion detection signals supplied from the line memory 112 on the pixel basis. The vertical point removing unit 42 also includes pixel memories 115, 116 for sequentially shifting the motion detection signals supplied from the line memory 111 on the pixel basis, pixel memories 117, 118 for sequentially shifting the motion detection signals supplied from the switching unit 41 on the pixel basis, and an OR gate 119 for outputting a logical sum of the output signals of the pixel memory 113 and 117. The vertical point removing unit 42 also includes an AND gate 120 for outputting a logical product of the output signals of the OR gate 119 and the pixel memory 115, and a pixel memory 121 for shifting the motion detection signal supplied from the AND gate 120 on the pixel basis. The vertical point removing unit 42 also includes an AND gate 122 for outputting a logical product of the output signals of the switching unit 41 and the pixel memories 114 and 115, and an AND gate 123 for outputting a logical product of the output signals of the line memory 111 and the pixel memories 115 and 116. The vertical point removing unit 42 also includes an AND gate 124 for outputting a logical product of the output signals of the line memory 112 and the pixel memories 115 and 118, and an OR gate 125 for outputting a logical sum of the AND gates 122, 123 and 124. The vertical point removing unit 42 further includes a pixel memory 126 for shifting the motion detection signal supplied from the OR gate 125 pixel-by-pixel and a switch S10 for routing the output signals of the pixel memories 116 or 121 to the interpolation area enlargement unit 43 responsive to a motion detection signal of the pixel memory 126.

The output signal from the line memory 112 is an output signal of a horizontal line directly previous to the line of the output signals of the line memory 111, while the output signal of the line memory 111 is an output signal of a horizontal line directly previous to the line of the output signals of the switching unit 41.

The output signals of the pixel memories 114, 116 and 118 are output signals of pixels directly previous to the pixels of the output signals of the pixel memories 113, 115 and 117, respectively, while the output signals of the pixel memories 113, 115 and 117 are output signals of pixels directly previous to the pixels of the output signals of the pixel memories 112 and 111 and the switching unit 41, respectively.

In the above-described vertical point removing unit 42, the AND gates 122, 123 and 124 output high level signal or low level signals if three or more pixels constituting picture signals a re present contiguously in the rightward descending direction (oblique right direction), horizontal direction or in the leftward descend ing direction (oblique left direction), and otherwise, respectively. The OR gate 125 detects whether or not three or more pixels are present contiguously in the horizontal direction or in both of the oblique directions. The point removal is carried out based on the results of detection.

The operation of the vertical point removing unit 42 is hereinafter explained.

It is assumed that output signals of the line memory 112, line memory 111 and the switching unit 41 are the horizontal lines 1, 2 and 3, respectively, output signals of the pixel memories 114, 116 and 118 are motion detection signals of the first pixels of the horizontal lines 1, 2 and 3, respectively, output signals of the pixel memories 113, 115 and 117 are motion detection signals of the second pixels of the horizontal lines 1, 2 and 3, respectively, and output signals of the line memories 112 and 111 and the switching unit 41 are motion detection signals of the third pixels of the horizontal lines 1, 2 and 3, respectively.

The AND gate 122 outputs a logical product of the third pixel of the horizontal line 1, the second pixel of the horizontal line 2 and the first pixel of the horizontal line 3 and detects whether or not three or more moving pixels are arranged in the oblique right direction about the second pixel of the second horizonal line 2 as the center.

The AND gate 123 outputs a logical product of the first, second and third pixels of the horizontal line 2, and detects whether or not three or more moving pixels are arranged in the horizontal direction about the second pixel of the second horizonal line 2 as the center.

The AND gate 124 outputs a logical product of the first pixel of the horizontal line 1, the second pixel of the horizontal line 2 and the third pixel of the horizontal line 3 and detects whether or not three or more moving pixels are arranged in the oblique left direction about the second pixel of the second horizontal line 2 as the center.

The OR gate 125 outputs a logical sum of the output signals of the AND gates 122, 123 and 124 and detects whether or not three or more moving pixels are arranged in the oblique right direction, oblique left direction or in the horizontal direction about the second pixel of the horizontal line 2 as the center.

The switch S10 is responsive to the output signal of the pixel memory 126 having the output signal of the OR gate 125 stored therein to transmit the logical sum of the third pixel of the horizontal line 3 and the first pixel of the horizontal line 2 or the logical sum of the third pixel of the horizontal line 3 and the second pixel of the horizontal line 1 if three or more moving pixels are arranged in the oblique right direction, oblique left direction or in the horizontal direction about the second pixel of the horizontal line 2 as the center, or otherwise, respectively.

If, when plural moving pixels are present in isolation in the vertical direction, three or more moving pixels are present contiguously in the horizontal direction or in both oblique directions, the above-described vertical point removing unit 42 sends a motion detection signal for the horizontal line 2 or interpolates the moving pixels with pixels lying above and below the second pixel of the horizontal line 2 for removing the points and routing a motion detection signal, respectively.

The interpolation area enlargement unit 43 includes a vertical enlargement unit 130 for enlarging the interpolation area in the vertical direction and a horizontal enlargement unit 140 for enlarging the interpolation area in the horizontal direction.

Figure 14:
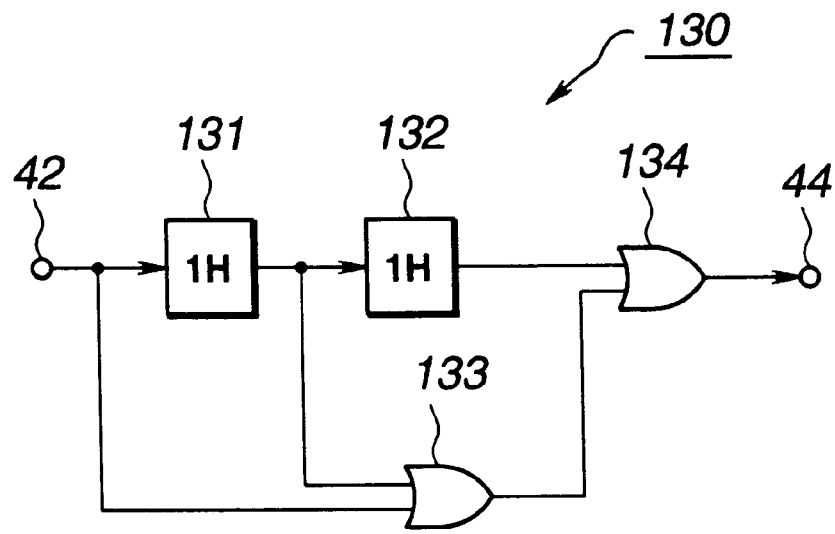
FIG. 14 is a vertical interpolating means of the interpolation area enlargement means of the field interpolating means.

Referring to FIG. 14, the vertical enlargement unit 130 includes a line memory 131 for shifting motion detection signals furnished from the vertical point removing unit 42 on the horizontal line basis, and a line memory 132 for shifting the motion detection signals furnished from the line memory 131 on the horizontal line basis. The vertical point removing unit 130 also includes an OR gate 133 for outputting a logical sum of the output signals of the vertical point removing unit 42 and the line memory 131, and an OR gate 134 for outputting a logical sum of output signals of the OR gate 133 and the line memory 132 to the horizontal enlargement unit 140.

The OR gate 133 outputs a high level signal or a low level signal when a motion-detected pixel is or is not contained in the output signals of the vertical point removing unit 42 or the line memory 131, respectively.

The OR gate 134 outputs a high level signal or a low level signal when a motion-detected pixel is or is not contained in the output signals of the OR gate 133 or the line memory 131, respectively.

The above-described vertical enlargement unit 130 outputs a high level signal or a low level signal from the OR gate 134 if a motion-detected pixel is contained or is not contained in at least one of three contiguous vertical lines, respectively. If the output signal of the OR gate 134 is the high level signal, the area of interpolation is increased in the vertical direction about the horizontal line detected to contain the moving pixel.

Figure 15:
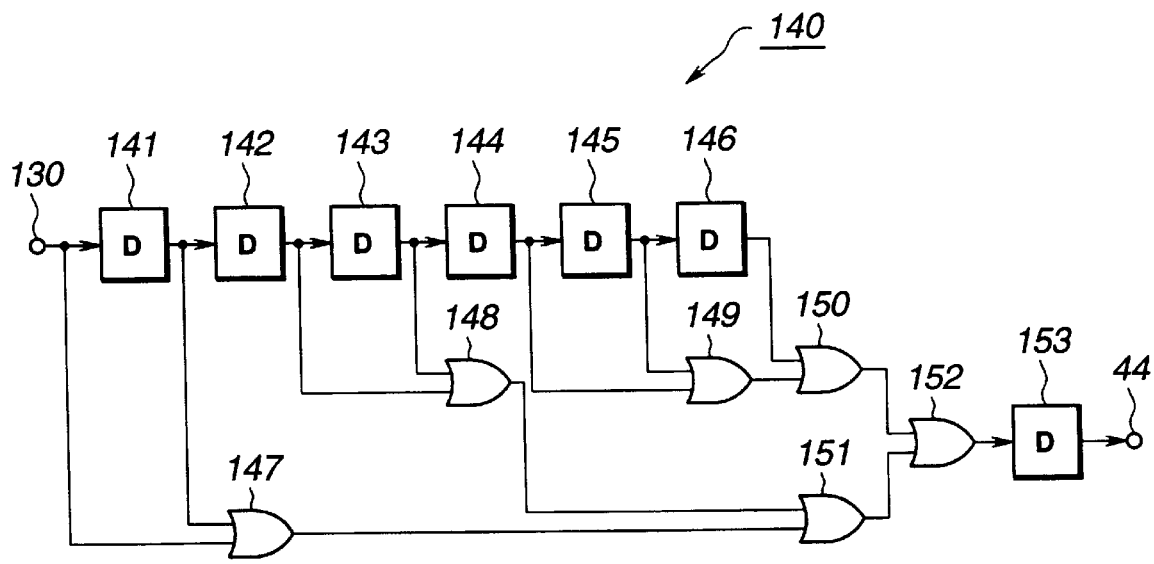
FIG. 15 is a horizontal interpolating means of the interpolation area enlargement means of the field interpolating means.

Referring to FIG. 15, the horizontal enlargement unit 140 includes pixel memories 141 to 147 for sequentially shifting signals from the vertical enlargement unit 130 on the sample basis. The horizontal enlargement unit 140 also includes an OR gate 148 for outputting a logical sum of output signals of the pixel memory 142 and the pixel memory 143 and an OR gate 149 for outputting a logical sum of output signals of the pixel memory 144 and the pixel memory 145. The horizontal enlargement unit 140 also includes an OR gate 150 for outputting a logical sum of output signals of the pixel memory 146 and an OR gate 149, and an OR gate 151 for outputting a logical sum of output signals of the pixel memory 147 and the OR gate 148. The horizontal enlargement unit 140 further includes an OR gate 152 for outputting a logical sum of output signals of the OR gates 150 and 151 and a pixel memory 153 for holding an output signal of the OR gate 152.

The horizontal enlargement unit 140 is fed with a signal which is pre-formed so as to become a high level signal or a low level signal depending on the presence or absence of pixel-based motion of pixels of a horizontal line as detected by the vertical enlargement unit 130, and outputs the high level signal or the low level signal from the pixel memory 153 if there is contained at least one motion-detected pixel in seven contiguous pixels or otherwise, respectively. If the output signal of the pixel memory 153 is a high level signal, the area of interpolation is enlarged in the horizontal direction about the pixel detected to be the moving pixel as center.

Figure 16:
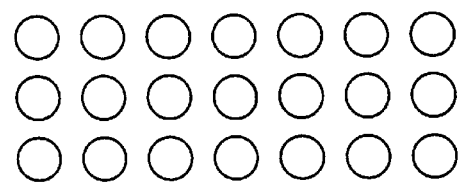
FIG. 16 schematically shows enlargement of an interpolation area of a moving pixel by the interpolation area enlargement means.

If the motion of the picture of the pixel indicated by black circle as shown in FIG. 16 is detected, the above-described interpolation area enlargement unit 43 enlarges the area of interpolation to an area of 7×3 pixels centered about the moving pixel.

Since it is possible with the interpolation area enlargement unit 43 to enlarge the area of interpolation of the pixel, detected to be moving by the detection unit 28, by a simplified arrangement, without producing contamination about the interpolated area, a high-quality picture may be formed in the picture signal processing device 10.

Figure 17:
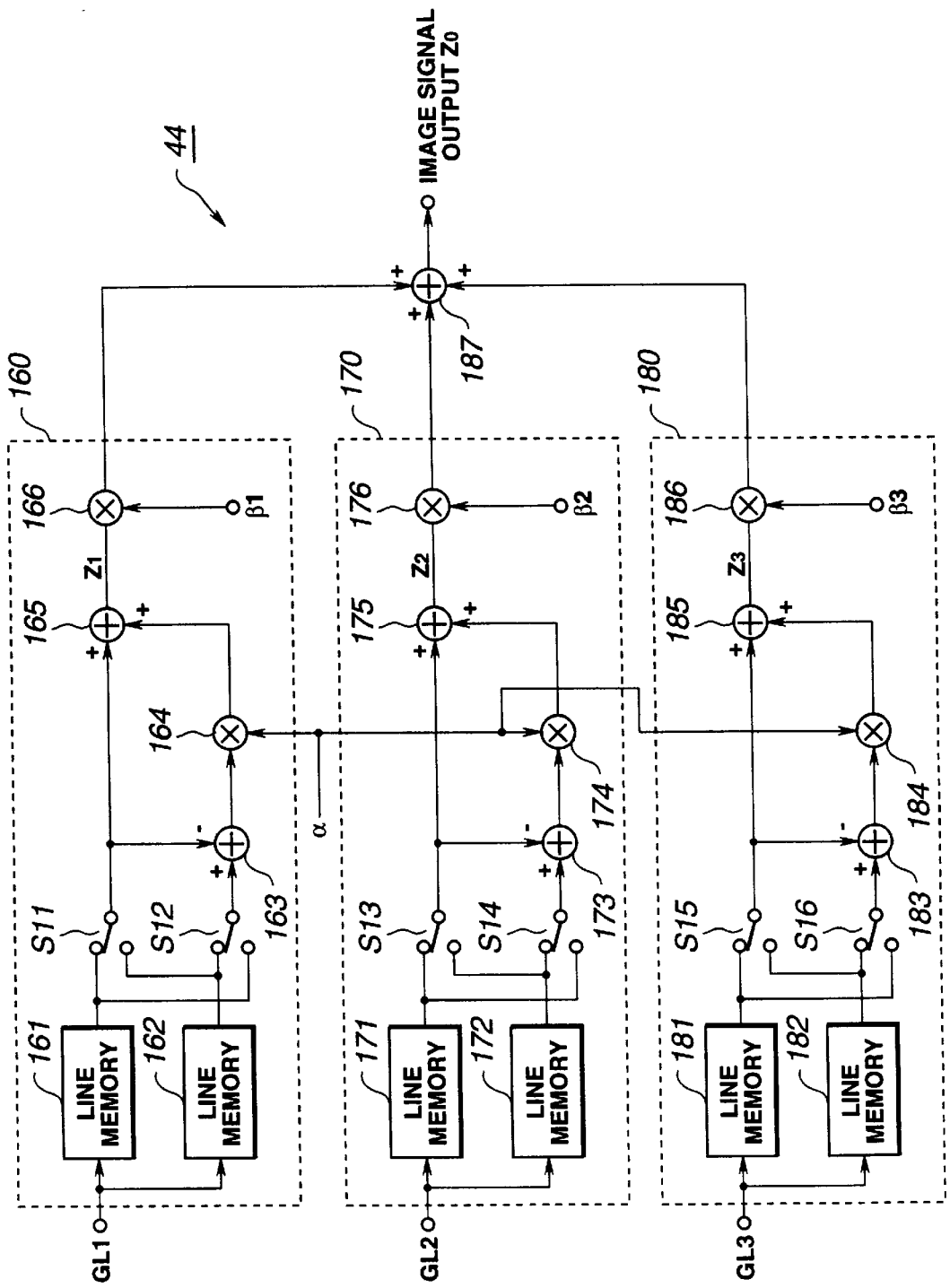
FIG. 17 is a circuit diagram showing essential portions of he field interpolating means.

Referring to FIG. 17, the smoothing unit 144 includes first, second and third interpolating units 160, 170 and 180 and an adder 187 for summing output signals of the first, second and third interpolating units 160, 170 and 180. The first, second and third interpolating units are furnished with a horizontal line GL1 of the picture signals, a horizontal line GL2 next to the horizontal line GL2 and a horizontal line GL3 next to the horizontal line GL2.

The first interpolation unit 160 includes a line memory 161 to which the picture signals of the horizontal line GL1 are supplied and readably recorded every pixel-based motion detection signal, and a line memory 162 to which the motion detection signals of the horizontal line GL1 are supplied and in which the pixel-based motion detection signal is readably recorded from the line memory 161. The first interpolation unit 160 also includes switches S11 and S12 supplied with motion detection signals of the line memories 161 and 162 for routing a motion detection signal of the line memory 161 or 162, and a subtractor 163 for subtracting an output signal of the switch S11 from the output signal of the line memory 162. The first interpolation unit 160 also includes a multiplier 164 for multiplying an output signal of the subtractor 163 with a horizontal correction coefficient $\alpha$, and an adder 165 for summing the output signal of the switch S11 to the output signal of the multiplier 164. The first interpolation unit 160 further includes a multiplier 166 for multiplying an output signal of the adder 165 with the vertical correction coefficient $\beta 1$ for supplying the resulting product to an adder 187.

The second interpolation unit 170 includes a line memory 171 furnished with the horizontal line GL2 and from which pixel-based motion detection signals are read, and a line memory 172 furnished with the horizontal line GL2 and from which pixel-based motion detection signals delayed one sample from the detection signals outputted by the line memory 172 are read. The second interpolation unit 170 also includes switches S13 and S14 furnished with output signals of the line memories 171 and 172 for routing the output signals of the line memories 171 and 172. The second interpolation unit 170 also includes a subtractor 173 for subtracting an output signal of the switch S13 from an output signal of the switch S14 and a multiplier 174 for multiplying an output signal of the subtractor 173 with the horizontal correction coefficient $\alpha$. The second interpolation unit 170 further includes an adder 175 for summing output signals of the switch S13 and the multiplier 174 and a multiplier 176 for multiplying an output signal of the adder 175 with the vertical correction coefficient $\beta 2$ and furnishing the resulting product signal to the adder 187.

The third interpolation unit 180 includes a line memory 181 furnished with the horizontal line GL3 and from which pixel-based motion detection signals are read, and a line memory 182 furnished with the horizontal line GL3 and from which pixel-based motion detection signals delayed one sample from the detection signals outputted by the line memory 181 are read out. The third interpolation unit 180 also includes switches S15 and S16 furnished with output signals of the line memories 181 and 182 for routing the output signals of the line memories 181 and 182. The third interpolation unit 180 also includes a subtractor 183 for subtracting an output signal of the switch S15 from an output signal of the switch S16 and a multiplier 184 for multiplying an output signal of the subtractor 183 with the horizontal correction coefficient $\alpha$. The third interpolation unit 180 further includes an adder 185 for summing output signals of the switch S15 and the multiplier 184 and a multiplier 186 for multiplying an output signal of the adder 185 with the vertical correction coefficient $\beta 3$ and furnishing the resulting product signal to the adder 187.

Figure 18:
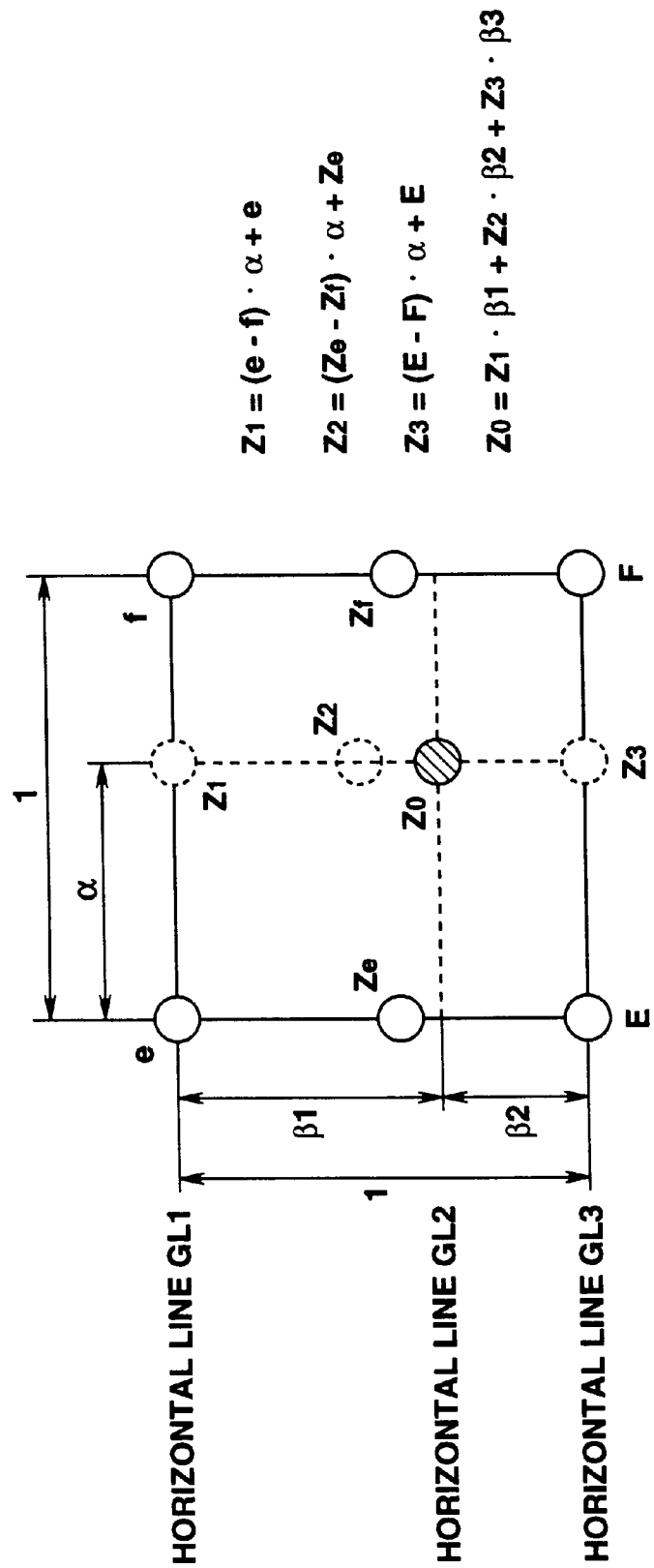
FIG. 18 shows the principle of an interpolating operation by the field interpolation means.

In the above-described smoothing unit 44, if, when output signals of the line memories 161, 162 can be sent from the switches S11, S12, output signals of the line memories 171, 172 can be sent from the switches S13, S14 and output signals of the line memories 181, 182 can be sent from the switches S15, S16, pixels e, f of the horizontal line GL2 are sent from the switches S11 and S12, pixels Ze and Zf of the horizontal line GL2 are sent from the switches S13 and S14 and pixels E and F of the horizontal line GL3 are sent from the switches S15 and S16, as shown in FIG. 18, output signals Z1, Z2 and Z3 of the adders 165, 175 and 185 are calculated by the following equations (8), (9) and (10), respectively:

$$Z1=(e-f)*\alpha+e \qquad (8)$$

$$Z2=(Ze-Zf)*\alpha+Ze \qquad (9)$$

$$Z3=(E-F)*\alpha+E \qquad (10)$$

On the other hand, an output signal of the adder 187 is calculated by the following equation (11):

$$Z0=Z1*\beta 1+Z2*\beta 2+Z3*\beta 3 \qquad (11)$$

The horizontal interpolation coefficient $\alpha$ is pre-set for horizontally interpolating the pixel e lying above the pixel Ze judged to be moving, the pixel Ze, the pixel E lying below the pixel Ze, pixels f, Zf and F one sample after the pixels e, Ze and E in accordance with the above equations (8) to (10).

The vertical interpolation coefficient $\beta 1$, $\beta 2$ and $\beta 3$ are pre-set by a software interpolation coefficient generator 190 for vertically interpolating the pixels Z1, Z2 and Z3 as indicated by the above equation (11).

Figure 19:
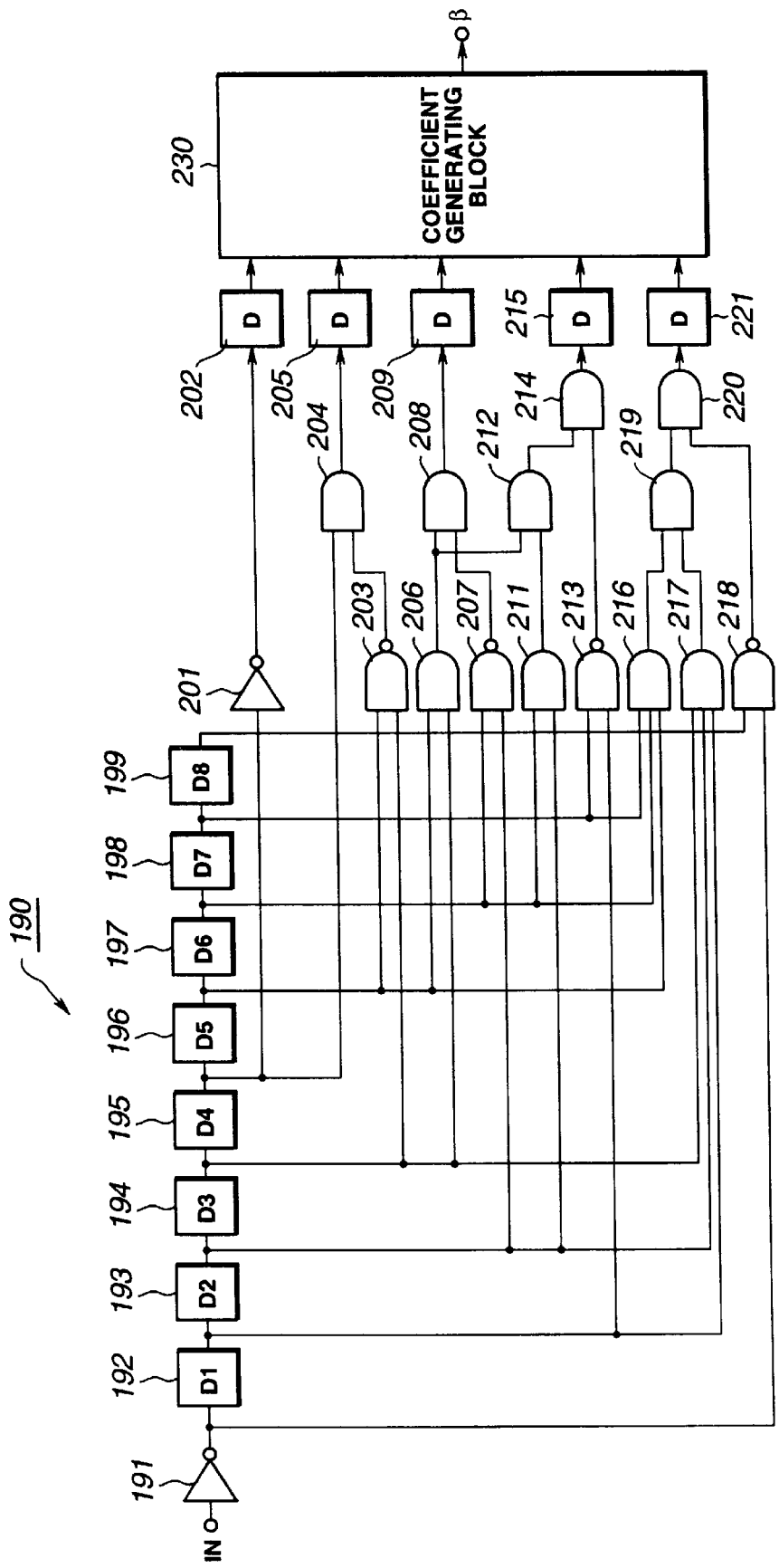
FIG. 19 is a circuit diagram showing essential portions of smoothing means of the field interpolation means.
Figure 20:
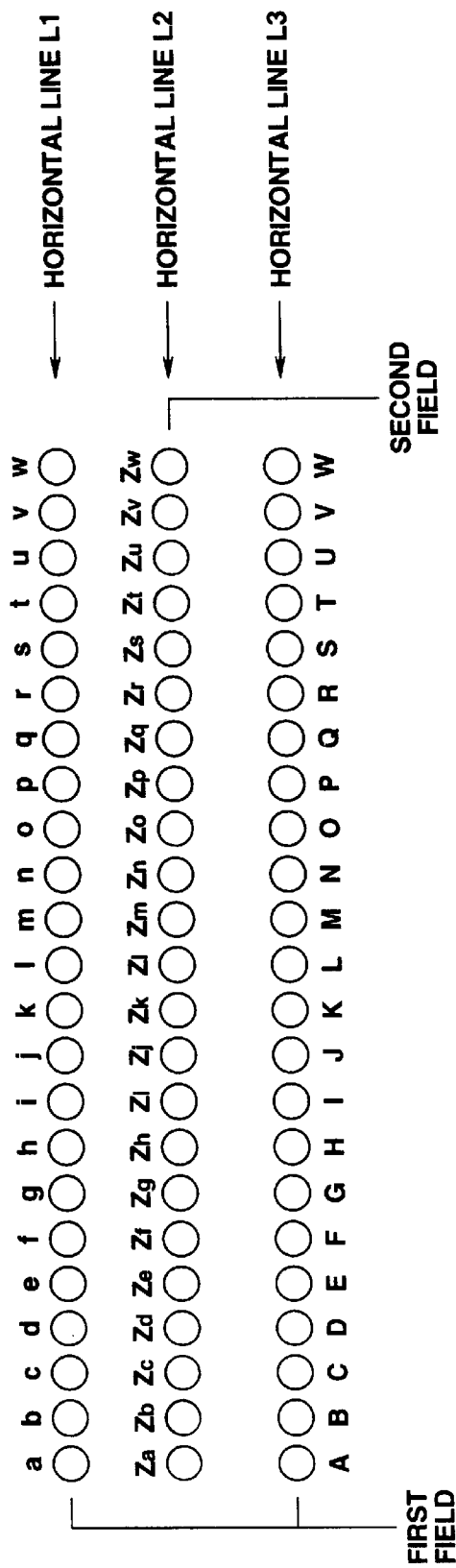
FIG. 20 schematically shows picture signals for illustrating the smoothing operation by the smoothing means.

Referring to FIG. 19, the software interpolation coefficient generator 190 includes an invertor circuit 191 for inverting an input signal and for outputting the resulting inverted signal, and pixel memories 192 to 199 for sequentially shifting the input signals from the invertor circuit 191 on the sample basis. The software interpolation coefficient generator 190 also includes an invertor circuit 201 for inverting an output signal from the pixel memory 195 and outputting the resulting inverted signal, and a pixel memory 202 for holding an output signal of the invertor circuit 201. The software interpolation coefficient generator 190 also includes a NAND gate 203 for outputting an inverted signal of a logical product of output signals of the pixel memories 194 and 196, and an AND gate 204 for outputting a logical product of output signals of the NAND gate 203 and the pixel memory 195. The software interpolation coefficient generator 190 also includes a pixel memory 205 for holding an output signal of the AND gate 204 and an AND gate 206 for outputting a logical product of output signals of the pixel memories 194 and 196. The software interpolation coefficient generator 190 also includes a NAND gate 207 for outputting an inverted signal of a logical product of output signals of the pixel memories 193 and 197, and an AND gate 208 for outputting a logical product of output signals of the NAND gate 207 and the AND gate 206. The software interpolation coefficient generator 190 also includes a pixel memory 209 for holding an output signal of the AND gate 208 and an AND gate 211 for outputting a logical product of output signals of the pixel memories 193 and 197. The software interpolation coefficient generator 190 also includes an AND gate 212 for outputting a logical product of output signals of the AND gates 211 and 206, and a NAND gate 213 for outputting an inverted signal of a logical product of the output signals of the pixel memories 192 and 198. The software interpolation coefficient generator 190 also includes an AND gate 214 for outputting a logical product of output signals of the NAND gate 213 and the AND gate 212, and a pixel memory 215 for holding an output signal of the AND gate 214. The software interpolation coefficient generator 190 also includes an AND gate 216 for outputting a logical output of the pixel memories 196, 197 and 198 and an AND gate 217 for outputting a logical output of the pixel memories 192, 193 and 194. The software interpolation coefficient generator 190 also includes a NAND gate 218 for outputting an inverted signal of a logical product of output signals of the invertor circuit 191 and the pixel memory 199, and an AND gate 219 for outputting a logical product of output signals of the AND gate 216 and the AND gate 217. The software interpolation coefficient generator 190 also includes an AND gate 220 for outputting a logical product of output signals of the AND gate 219 and the NAND gate 218 and a pixel memory 221 for holding an output signal of the AND gate 214. The software interpolation coefficient generator 190 further includes a coefficient generating block 230 for outputting the coefficient correction coefficient β responsive to output signals of the pixel memories 202, 205, 209, 215 and 221.

The invertor circuit 191 is furnished with a detection signal which becomes a high level signal or a low level signal depending on the presence or absence of pixel-based motion in a horizontal line, respectively.

The invertor circuit 201 is configured for outputting a high level signal when there are two low-level pixels between mutually adjacent high-level signals.

The AND gate 204 is configured for outputting a high level signal when there are two low-level pixels between mutually adjacent high-level signals.

The AND gate 208 is configured for outputting a high level signal when there are three low-level pixels between mutually adjacent high-level signals.

The AND gate 214 is configured for outputting a high level signal when there are four or five low-level pixels between mutually adjacent high-level signals.

The AND gate 220 is configured for outputting a high level signal when there are six or seven low-level pixels between mutually adjacent high-level signals.

The above-described constitution of the software interpolation coefficient generator 190 is furnished with a high level signal or a low level signal depending upon the presence or absence of detected motion in the picture of the pixel in a horizontal line having such motion-detected pixel, respectively, and outputs the vertical correction coefficient β based upon the number of pixels of the low-level signals between mutually neighboring high-level signals.

The operation of the smoothing unit 44 having the above constitution is hereinafter explained.

If, in a horizontal line L2 of a second field which has pixels Za to Zw arrayed in the horizontal direction, and which is positioned between a horizontal line L1 of a first field, having pixels a to w arrayed in the horizontal direction, and a horizontal line L2 of the first field, having pixels A to W arrayed in the horizontal direction, pixels Za to Zc, Zn to Zo and Zt to Zv, denoted by black circles, are detected to be moving pixels, the pixels Za, Zb and Zc are interpolated by pixels lying above and below the pixels Za, Zb and Zc in accordance with the following equations (12), (13) and (14):

$$Za=(a+A)/2 \qquad (12)$$

$$Zb=(b+B)/2 \qquad (13)$$

$$Zc=(c+C)/2 \qquad (14)$$

The pixels Zd to Zm are interpolated by software interpolation coefficient SK×(sum of pixels lying above and below the pixels Zd to Zm)+(1-software interpolation coefficient SK×2)×pixels Zd to Zm, specifically, by the following equations (15) to (24):

$$Zd=0.4\times(d+D)+0.2\times Zd \qquad (15)$$

$$Ze=0.3\times(e+E)+0.4\times Ze \qquad (16)$$

$$Zf=0.2\times(f+F)+0.6\times Zf \qquad (17)$$

$$Zg=0.1\times(g+G)+0.8\times Zg \qquad (18)$$

$$Zh=Zh \qquad (19)$$

$$Zi=Zi \qquad (20)$$

$$Zj=0.1\times(i+J)+0.8\times Zj \qquad (21)$$

$$Zk=0.2\times(k+K)+0.6\times Zk \qquad (22)$$

$$Zl=0.3\times(1+L)+0.4\times Zl \qquad (23)$$

$$Zm=0.4\times(m+M)+0.2\times Zm \qquad (24)$$

Thus the smoothing unit 44 causes the values of interpolation for pixels in a horizontal line having motion-detected pixels to be continuously changed so that the pixels lying closer to the motion-detected pixels in the horizontal line will be influenced more conspicuously by the pixels lying above and below the pixels, so that there is no contamination produced in the boundary between the motion-detected pixel and the pixels lying adjacent thereto, thus assuring a high-quality picture.

With the above-described constitution of the motion detection unit 28, the motion detection coefficient is variably set by the first detection coefficient setting unit 33 supplied with the picture signals from the frame storage means 17 and by the second detection coefficient setting unit 38 fed with the picture signals freed of the horizontal components by the horizontal component cutting filter 37 so that, when the vertical edge is detected in the picture signals by the vertical edge detection unit 30, the motion detection sensitivity will be lowered. The motion detection signal in the horizontal direction, both oblique directions and in the vertical direction, associated with the motion detection coefficient set for lowering or raising the motion detection sensitivity by the first and second detection coefficient setting units 33, 38 depending upon the presence or absence of detected motion in the picture signals of the directly previous horizontal line supplied from the first and second detection coefficient setting units 33, 38 and freed of the horizontal point by the horizontal point removing units 34, 39, are sent from the switching unit 41 o the vertical point removing unit 42. Of the picture signals freed of vertical points by the vertical point removing unit 42, the pixels under detection, whose motion has been detected from the motion detection signal, are processed with interpolation area enlargement by the interpolation area enlargement unit 43, so as to be smoothed in the enlarged interpolation area by the smoothing unit 44 and then routed to the field interpolation unit 29.

Thus, by setting the motion detection coefficient K to an optimum threshold value depending upon the motion detection signal of the directly previous horizontal line for detecting the motion in both oblique directions, horizontal direction and in the vertical direction, an optimum threshold value which will not lead to mistaken detection of vertical edges or the noise as being the motion can be promptly set by a simplified constitution in a manner for realizing high-precision detection of picture motion of the pixel under detection irrespective of the direction of motion, as the points not present as the motion of an object are removed. The interpolation area of the pixel under detection, whose motion has been detected by the interpolation area enlargement unit 43, is enlarged by the interpolation area enlargement unit 43. The pixel under detection is then smoothed by the smoothing unit 44 in the enlarged interpolation area thus enlarged by the interpolation area enlargement unit 43.

Since the field interpolating unit 29 effects intra-field interpolation in the enlarged and smoothed area of interpolation, there is no density variation or picture signal level inversion in the peripheral area of the interpolated region, thus realizing a high-quality picture free from contamination in the peripheral area.

The picture signal processing device 10 thus achieve a high-quality enlarged or contracted picture by a simplified constitution.

What is claimed is:

1. A signal processing device for processing a picture, comprising:

vertical edge detection means for detecting in said picture a vertical edge based on a difference between signal levels of pixels in neighboring scan lines of a frame comprised of first and second fields, said first field containing every other scan line and said second field containing remaining scan lines in said frame;

detection coefficient setting means for variably setting a motion detection coefficient in response to said vertical edge detection means;

motion detection means for detecting in said frame a motion of a pixel selectively located in said first or second field as a function of a signal level of said pixel, signal levels of pixels adjacent said pixel and said motion detection coefficient;

field interpolation means for being operative to perform an intra-field interpolation of said signal level of said pixel in response to said motion detection means detecting said motion of said pixel; and interpolation area enlarging means for enlarging an interpolation area in said frame containing said pixel if said motion detection means detects said motion of said pixel.

2. The signal processing device according to claim 1, further comprising horizontal point removing means for eliminating said pixel if said motion detection means detects said motion of said pixel.

3. The signal processing device according to claim 1, further comprising smoothing means for smoothing said signal level of said pixel located in said interpolation area.

4. The signal processing device according to claim 1, wherein said motion detection means detects said motion of said pixel in horizontal, oblique and vertical directions of said frame.

5. The signal processing device according to claim 4, further comprising horizontal component cut-off means for removing horizontal components of the signal levels of pixels in said frame such that said motion detection means detects said motion of said pixel in said vertical direction in response to said horizontal component cut-off means.

6. The signal processing device according to claim 1, wherein said motion detection coefficient is set to a lower sensitivity value based on detecting said motion of said pixel in an immediately preceding horizontal scan line.

7. The signal processing device according to claim 1, wherein said motion detection coefficient is set to a lower sensitivity value when said vertical edge is detected by said vertical edge detection means.

* * * * *